(12) United States Patent
Liu

(10) Patent No.: US 10,911,530 B2
(45) Date of Patent: Feb. 2, 2021

(54) CONTENT DELIVERY METHOD, VIRTUAL SERVER MANAGEMENT METHOD, CLOUD PLATFORM, AND SYSTEM

(71) Applicant: Huawei Technologies Co., Ltd., Shenzhen (CN)

(72) Inventor: Zheng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 114 days.

(21) Appl. No.: 15/985,071

(22) Filed: May 21, 2018

(65) Prior Publication Data

US 2018/0278680 A1    Sep. 27, 2018

Related U.S. Application Data

(63) Continuation of application No. PCT/CN2016/094421, filed on Aug. 10, 2016.

(30) Foreign Application Priority Data

Nov. 20, 2015    (CN) .......................... 2015 1 0808757

(51) Int. Cl.
*G06F 15/173*    (2006.01)
*H04L 29/08*    (2006.01)

(52) U.S. Cl.
CPC .......... *H04L 67/1031* (2013.01); *H04L 29/08* (2013.01); *H04L 67/1065* (2013.01);
(Continued)

(58) Field of Classification Search
None
See application file for complete search history.

(56) References Cited

U.S. PATENT DOCUMENTS

2002/0073167 A1* 6/2002 Powell ................ H04L 12/5692
709/217
2010/0211987 A1    8/2010 Chou
(Continued)

FOREIGN PATENT DOCUMENTS

CN    102439913 A    5/2012
CN    102571959 A    7/2012
(Continued)

OTHER PUBLICATIONS

Machine Translation and Abstract of Chinese Publication No. CN104506620, Apr. 8, 2015, 13 pages.
(Continued)

*Primary Examiner* — Aftab N. Khan
*Assistant Examiner* — Anh Nguyen
(74) *Attorney, Agent, or Firm* — Conely Rose, P.C.

(57) ABSTRACT

A content delivery method and system, where the content delivery method includes receiving, by a first virtual server, a first request message from a content requester, where the first request message carries a first uniform resource locator (URL) of user-requested content, determining, by the first virtual server according to a cache list maintained by the first virtual server, that one of one or more storage servers managed by the first virtual server has cached the content corresponding to the first URL, and redirecting the first request message to a first storage server that is recorded in the cache list and that has cached the content corresponding to the first URL. A computation capability and a storage capability of a server cluster are separated, and content input/output (I/O) throughput performance is effectively improved.

18 Claims, 15 Drawing Sheets

(52) U.S. Cl.
CPC ...... *H04L 67/1097* (2013.01); *H04L 67/2814* (2013.01); *H04L 67/2842* (2013.01); *H04L 67/288* (2013.01); *H04L 67/2852* (2013.01)

(56) References Cited

U.S. PATENT DOCUMENTS

| | | |
|---|---|---|
| 2010/0223364 A1 | 9/2010 | Wei |
| 2012/0203910 A1* | 8/2012 | Lan ............... H04L 67/1029 709/226 |
| 2013/0007186 A1* | 1/2013 | Liu ............... H04L 67/1008 709/213 |
| 2014/0059312 A1* | 2/2014 | Uno ............... G06F 3/0655 711/162 |
| 2014/0108474 A1* | 4/2014 | David ............. G06F 3/0611 707/827 |
| 2014/0337417 A1* | 11/2014 | Park .............. H04L 67/1027 709/203 |
| 2015/0234682 A1* | 8/2015 | Dageville ........ G06F 9/4881 718/104 |
| 2015/0281111 A1* | 10/2015 | Carl ............... H04L 47/70 709/226 |

FOREIGN PATENT DOCUMENTS

| | | |
|---|---|---|
| CN | 104506620 A | 4/2015 |
| CN | 104506637 A | 4/2015 |
| CN | 104580393 A | 4/2015 |
| CN | 104702702 A | 6/2015 |
| CN | 104935648 A | 9/2015 |
| WO | 2013164401 A1 | 11/2013 |
| WO | 2015126968 A2 | 8/2015 |

OTHER PUBLICATIONS

Machine Translation and Abstract of Chinese Publication No. CN104580393, Apr. 29, 2015, 27 pages.
Foreign Communication From a Counterpart Application, Chinese Application No. 201510808757.8, Chinese Office Action dated Apr. 2, 2019, 9 pages.
Machine Translation and Abstract of Chinese Publication No. CN102571959, Jul. 11, 2012, 17 pages.
Machine Translation and Abstract of Chinese Publication No. CN104506637, Apr. 8, 2015, 22 pages.
Machine Translation and Abstract of Chinese Publication No. CN104702702, Jun. 10, 2015, 16 pages.
Machine Translation and Abstract of Chinese Publication No. CN104935648, Sep. 23, 2015, 25 pages.
Foreign Communication From a Counterpart Application, PCT Application No. PCT/CN2016/094421, English Translation of International Search Report dated Oct. 28, 2016, 2 pages.
Foreign Communication From a Counterpart Application, European Application No. 16865571.0, Extended European Search Report dated Sep. 17, 2018, 10 pages.

* cited by examiner

CONTENT DELIVERY METHOD, VIRTUAL SERVER MANAGEMENT METHOD, CLOUD PLATFORM, AND SYSTEM

CROSS-REFERENCE TO RELATED APPLICATIONS

This application is a continuation of International Patent Application No. PCT/CN2016/094421 filed on Aug. 10, 2016, which claims priority to Chinese Patent Application No. 201510808757.8 filed on Nov. 20, 2015. The disclosures of the aforementioned applications are hereby incorporated by reference in their entireties.

TECHNICAL FIELD

The present disclosure relates to the field of communications technologies, and in particular, to a content delivery method, a virtual server management method, a cloud platform, and a system.

BACKGROUND

A content delivery network (CDN) system is a distributed server system constructed on the Internet. Usually, the CDN system is also referred to as a content delivery system or a CDN. The system includes multiple data centers in order to transmit content on a network to a user more quickly and stably, reduce a network latency, and improve user experience. Each of the data centers may be referred to as a CDN node. The CDN nodes may be located in multiple places and multiple different networks to reduce traffic required during content transmission, and reduce bandwidth costs. The CDN nodes also dynamically transmit content to each other, and optimize a downloading behavior of the user to reduce bandwidth costs required by a content provider, increase a downloading speed for the user, and improve system stability.

The CDN nodes in the CDN system may be classified into a central node and an edge node. Each central node includes one or more central servers, and each edge node includes one or more edge servers. The central node generally caches all network content that needs to be delivered, and the edge node caches only a part of the network content that needs to be delivered. When a user accesses content on the Internet, a domain name system (DNS) allocates access of the user to an edge node nearest to the user. If the edge node accessed by the user has stored the content required by the user, the edge node directly returns the user-requested content to the user. If the edge node accessed by the user does not store the content required by the user, the edge node obtains, from a server in which a content source is located, the content accessed by the user, and returns the content to the user. For example, the edge node may obtain, from the central node, the content accessed by the user, and return the content to the user.

In some other approaches, cloud computing is applied to a content delivery method. Infrastructure as a service (IaaS) provided by cloud computing enables a consumer to deploy and run various software such as an operating system and an application program using processing, storage, network, and various basic computing resources. A client may arbitrarily deploy and run processing, storage, network, and other basic computing resources without purchasing a network device such as a server or software, to control an operating system, a storage apparatus, and a deployed application program. An enterprise may quickly deploy a resource or obtain a service based on a virtualization technology according to an ever-changing organizational architecture, management and control mode, and service requirement of the enterprise, to quickly provide a dynamic, flexible, changing, virtual, shared, and efficient computing resource service for an enterprise cloud application service. The virtualization technology is the most important technology in the IaaS, that is, multiple virtual machines are created on a single physical server using virtualization management software, and each virtual machine is used as one server.

In the content delivery method in the other approaches, a CDN directly based on a cloud computing technology is used. The CDN is generally in a hierarchical structure. The hierarchical structure may be a two-layer structure formed by the central node and the edge node above, or the CDN may be in a three-layer structure formed by a central node, an intermediate node, and an edge node. Each layer is a server cluster including one or more servers. A specific representation form of the CDN directly based on the cloud computing technology is to use the virtualization technology of cloud computing, and directly consider a virtual server as a physical server in a conventional CDN. A central node server cluster, an intermediate node server cluster, an edge node server cluster, and the like are constructed in different data centers. All servers in the server cluster are virtual servers.

The CDN directly based on the cloud computing technology has an advantage that CDN management and control software may be directly used, and has advantages brought by cloud computing. For example, commodity hardware may be used, and a device occupies small space.

However, when a CDN is directly constructed based on a server cluster including virtual servers, content input/output (I/O) of the CDN needs to be performed using a virtual server. Performance of content I/O based on a virtual server is much lower than performance of content I/O based on a physical server. Therefore, content I/O performance of the CDN based on cloud computing deteriorates drastically, affecting user experience.

SUMMARY

Embodiments of the present disclosure provide a content delivery method, a virtual server management method, a cloud platform, and a system to greatly improve content I/O performance of a CDN that is based on cloud computing.

According to a first aspect, a content delivery method is provided, applied to a content delivery system, where the content delivery system includes at least two virtual servers and at least two storage servers, any one of the at least two virtual servers manages one or more of the at least two storage servers, and the any virtual server is used as a first virtual server to execute the following method, including receiving, by the first virtual server, a first request message sent by a content requester, where the first request message carries a first uniform resource locator (URL) of user-requested content, determining, by the first virtual server according to a cache list maintained by the first virtual server, that one of the storage servers managed by the first virtual server has cached the content corresponding to the first URL, and redirecting the first request message to a first storage server that is recorded in the cache list and that has cached the content corresponding to the first URL, where the first request message redirected to the first storage server is used to instruct the first storage server to send the cached content corresponding to the first URL to the content requester.

This embodiment of the present disclosure provides a content delivery method. A computation capability and a storage capability of a server cluster are separated, the computation capability is implemented using a virtualization technology of cloud computing, and the storage capability is implemented using an independent storage server such that the storage server may directly send content to a content requester without a virtual server, and content I/O throughput performance is effectively improved.

With reference to the first aspect, in a first possible implementation of the first aspect, the method further includes receiving, by the first virtual server, a second request message sent by the content requester, where the second request message carries a second URL of user-requested content, determining, by the first virtual server according to the cache list maintained by the first virtual server, that none of the storage servers managed by the first virtual server caches the content corresponding to the second URL carried in the second request message, determining, by the first virtual server according to a consistent hashing algorithm, a second storage server configured to cache the content corresponding to the second URL carried in the second request message, and redirecting the second request message to the second storage server, where the second request message redirected to the second storage server is used to instruct the second storage server to retrieve the user-requested content and send the retrieved user-requested content to the content requester.

In the foregoing implementation, when none of storage servers managed by a virtual server caches user-requested content, a storage server configured to cache the user-requested content is determined according to a consistent hashing algorithm. The storage server retrieves the user-requested content, and sends the retrieved user-requested content to a content requester. Such a method may ensure load balance while improving content I/O performance.

With reference to the first aspect, in a second possible implementation of the first aspect, before determining, by the first virtual server according to a cache list maintained by the first virtual server, that one of the storage servers managed by the first virtual server has cached the content corresponding to the first URL, the method further includes determining, by the first virtual server according to the first URL, carried in the first request message, of the user-requested content, that the first virtual server processes the first URL.

With reference to the first possible implementation of the first aspect, in a third possible implementation of the first aspect, before determining, by the first virtual server according to the cache list maintained by the first virtual server, that none of the storage servers managed by the first virtual server caches the content corresponding to the second URL carried in the second request message, the method further includes determining, by the first virtual server according to the second URL, carried in the second request message, of the user-requested content, that the first virtual server processes the second URL.

With reference to the second or the third possible implementation of the first aspect, in a fourth possible implementation of the first aspect, the method further includes receiving, by the first virtual server, a third request message sent by the content requester, where the third request message carries a third URL of user-requested content, determining, by the first virtual server according to the third URL, carried in the third request message, of the user-requested content, that a second virtual server processes the third URL, and redirecting the third request message to the second virtual server.

In the foregoing implementation, after a virtual server receives a request message sent by a content requester, before correspondingly processing the request message, the virtual server first needs to determine, according to a URL carried in the request message, a virtual server processing the URL. The virtual server correspondingly processes the request message when determining that the virtual server processes the URL is itself. The virtual server redirects the request message to another virtual server when determining that the URL needs to processed by the other virtual server. A person skilled in the art may understand that, the foregoing first virtual server is a virtual server that first receives the request message among multiple virtual servers included in a content delivery system, and the foregoing second virtual server is a virtual server that receives the request message after the first virtual server redirects the request message. Each virtual server processes only a URL corresponding to the virtual server itself, thereby achieving load balance at a virtual server level.

With reference to the second or the third or the fourth possible implementation of the first aspect, in a fifth possible implementation of the first aspect, determining, by the first virtual server according to a URL, carried in a request message, of user-requested content, a virtual server processing the URL includes computing, by the first virtual server according to the URL, carried in the request message, of the user-requested content, a hash value of the URL, obtaining hash values of all partitions in a distributed database, and querying, based on the consistent hashing algorithm according to the hash value of the URL, for a partition corresponding to the URL, where each of the storage servers included in the content delivery system is divided into at least one partition, and determining, according to a hash value of the partition corresponding to the URL and a correspondence stored in the distributed database between a hash value of a partition and a hash value of a virtual server, the virtual server processing the URL.

In the foregoing implementation, a method for determining a virtual server processing a URL is provided. A distributed database stores a correspondence between a hash value of a partition and a hash value of a virtual server. Therefore, in this embodiment of the present disclosure, a hash value of a partition corresponding to a URL is first determined according to a consistent hashing algorithm, and then a virtual server processing the URL may be found in the distributed database according to the determined hash value of the partition. Such a manner is simple and easy to implement, and may improve processing efficiency taking advantage of cloud computing.

With reference to the first possible implementation of the first aspect, in a sixth possible implementation of the first aspect, each of the storage servers included in the content delivery system is divided into at least one partition, and after the redirecting the second request message to the second storage server, the method further includes updating, by the first virtual server, popularity information corresponding to the second URL, determining, according to the popularity information, that the content corresponding to the second URL needs to be cached, determining that a storage capacity of a partition corresponding to the second URL is not full, and instructing the second storage server to cache the content corresponding to the second URL into the partition corresponding to the second URL.

In the foregoing implementation, when a storage server does not cache content corresponding to a URL, it is determined according to popularity information whether the content corresponding to the URL needs to be cached. Caching the content corresponding to the URL may effectively reduce a time for sending the content to a content requester such that content whose popularity is high is cached as much as possible to improve I/O efficiency of a content delivery system. In addition, when a storage capacity of a partition corresponding to the URL is not full, the content corresponding to the URL is cached into the partition corresponding to the URL, thereby effectively achieving load balance.

With reference to the sixth possible implementation of the first aspect, in a seventh possible implementation of the first aspect, each partition corresponds to one virtual server, and the method further includes determining, by the first virtual server, that the storage capacity of the partition corresponding to the second URL is full, determining that a storage capacity of at least one of multiple partitions managed by the first virtual server is not full, and selecting a partition whose storage capacity is not full, and instructing, by the first virtual server, the second storage server to cache the content corresponding to the second URL into the selected partition, and adding a hash value of the second URL, a hash value of the partition caching the content corresponding to the second URL, and the popularity information corresponding to the second URL to a record of a cache queue, or determining, by the first virtual server, that the storage capacity of the partition corresponding to the second URL is full, determining that storage capacities of the multiple partitions managed by the first virtual server are all full, and querying the cache queue for a record whose popularity is lower than a first threshold, and instructing, according to the found record, a storage server corresponding to a partition in the record to delete content corresponding to a URL in the record.

In the foregoing implementation, a method for managing content storage and deletion of a storage server by a virtual server is provided. When each partition corresponds to one virtual server and a storage capacity of a partition corresponding to a URL is full, content corresponding to the URL is stored in another partition that is managed by the virtual server and whose storage capacity is not full. When each partition corresponds to one virtual server, the storage capacity of the partition corresponding to the URL is full, and storage capacities of all partitions managed by the virtual server are full, content whose popularity is low is deleted according to popularity information. In such a manner, the virtual server can implement interlinked storage on the partitions managed by the virtual server, and disk utilization is improved.

With reference to the sixth possible implementation of the first aspect, in an eighth possible implementation of the first aspect, each partition has multiple hash values, one hash value of each partition corresponds to one virtual server, and after redirecting the second request message to the second storage server, the method further includes receiving, by the first virtual server, notification information that is reported when the storage capacity of the partition corresponding to the second URL is full and that indicates that the partition is full, where the notification information is reported by the second storage server to which the partition belongs to multiple virtual servers managing the partition, and sending, by the first virtual server, a deletion notification to the second storage server, where the deletion notification carries a URL of content that is in the partition managed by the first virtual server and whose popularity lower than a second threshold, and the deletion notification is used to instruct the second storage server to determine, according to popularity information of the content corresponding to the URL carried in the deletion notification, whether to delete the content corresponding to the URL carried in the deletion notification.

In the foregoing implementation, a method for managing content deletion of a storage server by a virtual server is provided. When each partition corresponds to multiple virtual servers and a storage capacity of a partition corresponding to a URL is full, the virtual server sends a deletion notification to a storage server corresponding to the URL. According to deletion notifications respectively sent by multiple virtual servers corresponding to the partition, the storage server compares popularity information carried in the deletion notifications, and deletes content whose popularity is low. In such a manner, the content whose popularity is low is highly accurately deleted from the partition of the storage server by means of negotiation among the multiple virtual servers.

Preferably, a manner in which multiple deletion notifications are sent may be used to further improve accuracy of content deletion. For example, when a storage server needs to delete content that occupies one third of a storage capacity of a partition, a URL of content that occupies only one thirtieth of the storage capacity may be added to a deletion notification. Content corresponding to a URL carried in a deletion notification of a virtual server is determined by means of a comparison, and notification information is sent to the virtual server, to instruct the virtual server to send another deletion notification.

According to a second aspect, a virtual server management method is provided, applied to a content delivery system, where the content delivery system includes at least two virtual servers and at least two storage servers, any one of the at least two virtual servers manages one or more of the at least two storage servers, each of the one or more storage servers is divided into at least one partition, each of the at least one partition is managed by one virtual server, and the method includes computing, by a cloud platform, a hash value of each partition of the content delivery system and a hash value of each virtual server of the content delivery system, determining, according to a consistent hashing algorithm or a random selection manner, a virtual server corresponding to each partition, and establishing a distributed database, and storing a correspondence between a hash value of a partition and a hash value of a virtual server in the distributed database.

This embodiment of the present disclosure provides a virtual server management method. In the method, a distributed database is established, a correspondence between a partition and a virtual server is determined in advance, and each partition is managed by one virtual server. In this way, a virtual server can implement interlinked storage on partitions managed by the virtual server, and disk utilization is improved.

With reference to the second aspect, in a first possible implementation of the second aspect, the method further includes determining, by the cloud platform according to load of the content delivery system, that a virtual server needs to be newly added, determining a quantity of partitions needing to be allocated to the newly added virtual server, selecting a partition whose quantity is the quantity from all partitions, deleting content in the selected partition, and allocating the selected partition to the newly added virtual server, and updating a correspondence between a partition and a virtual server in the distributed database, or determining, by the cloud platform according to load of the content delivery system, that a virtual server needs to be removed, instructing, by the cloud platform, a storage server to delete content in a partition corresponding to the to-be-removed virtual server, allocating the partition corresponding to the to-be-removed virtual server to another virtual server, and updating the correspondence between a partition and a virtual server, and deleting the to-be-removed virtual server.

In the foregoing implementation, a processing procedure of virtual server addition and removal when each partition is managed by one virtual server is provided. Regardless of virtual server addition or removal, a correspondence between a partition and a virtual server in a distributed database needs to be updated such that distributed processing for content delivery can still be achieved after virtual server addition and removal. When a virtual server is added, during update in the distributed database, a correspondence between hash values of the newly added virtual server and a partition managed by the virtual server needs to be added to the database, and a correspondence between hash values of the partition allocated to the newly added virtual server and a virtual server originally managing the partition needs to be deleted. When a virtual server is removed, during update in the distributed database, a correspondence between hash values of the removed virtual server and a partition originally managed by the virtual server needs to be deleted from the database, and a correspondence between hash values of the partition originally managed by the removed virtual server and a virtual server to which the partition originally managed by the removed virtual server is re-allocated needs to be added.

According to a third aspect, a virtual server management method is provided, applied to a content delivery system, where the content delivery system includes at least two virtual servers and at least two storage servers, any one of the at least two virtual servers manages one or more of the at least two storage servers, each of the one or more storage servers is divided into at least one partition, each of the at least one partition is managed by multiple virtual servers, each partition has multiple hash values, one hash value of each partition corresponds to one virtual server, and the method includes computing, by a cloud platform, a hash value of each partition of the content delivery system and a hash value of each virtual server of the content delivery system, determining, according to a consistent hashing algorithm or a random selection manner, multiple virtual servers corresponding to each partition, and establishing a distributed database, and storing a correspondence between a hash value of a partition and a hash value of a virtual server in the distributed database.

This embodiment of the present disclosure provides a virtual server management method. In the method, a distributed database is established, a correspondence between a hash value of a partition and a virtual server is determined in advance, and each partition is managed by multiple virtual servers, achieving distributed processing for content delivery.

With reference to the third aspect, in a first possible implementation of the third aspect, the method further includes determining, by the cloud platform according to load of the content delivery system, that a virtual server needs to be newly added, computing, by the cloud platform, a hash value of the newly added virtual server, obtaining all hash values of all partitions, allocating a hash value of a corresponding partition to the newly added virtual server based on the consistent hashing algorithm, deleting content in a cache queue of a virtual server originally corresponding to the allocated hash value of the partition, and allocating the selected hash value of the partition to the newly added virtual server, and updating a correspondence between a hash value of a partition and a virtual server in the distributed database, or determining, by the cloud platform according to load of the content delivery system, that a virtual server needs to be removed, determining, by the cloud platform, a hash value, corresponding to the to-be-removed virtual server, of a partition, instructing a storage server to delete content that is in the partition corresponding to the to-be-removed virtual server and that belongs to a cache queue of the virtual server, allocating the hash value, corresponding to the to-be-removed virtual server, of the partition to another virtual server, and updating the correspondence between a hash value of a partition and a virtual server, and deleting the to-be-removed virtual server.

In the foregoing implementation, a processing procedure of virtual server addition and removal when each partition is managed by multiple virtual servers is provided. Regardless of virtual server addition or removal, a correspondence between a hash value of a partition and a virtual server in a distributed database needs to be updated such that distributed processing for content delivery can still be achieved after virtual server addition and removal. When a virtual server is added, during update in the distributed database, only a correspondence between the newly added virtual server and a hash value of a partition managed by the virtual server needs to be added to the database, and a correspondence between hash values of the partition allocated to the newly added virtual server and a virtual server originally managing the partition does not need to be deleted. When a virtual server is removed, during update in the distributed database, only a correspondence between the removed virtual server and a hash value of a partition originally managed by the virtual server needs to be deleted from the database, the partition originally managed by the virtual server does not need to be re-allocated a virtual server, and a correspondence between hash values of the partition originally managed by the removed virtual server and a virtual server to which the partition originally managed by the removed virtual server is re-allocated does not need to be added.

According to a fourth aspect, a content delivery system is provided, where the content delivery system includes at least two virtual servers and at least two storage servers, any one of the at least two virtual servers manages one or more of the at least two storage servers, and the any virtual server is used as a first virtual server to execute the foregoing content delivery method.

This embodiment of the present disclosure provides a content delivery system. A computation capability and a storage capability of a server cluster are separated, the computation capability is implemented using a virtualization technology of cloud computing, and the storage capability is implemented using an independent storage server such that the storage server may directly send content to a content requester without a virtual server, and content I/O throughput performance is effectively improved.

According to a fifth aspect, a cloud platform is provided, applied to a content delivery system, where the content delivery system includes at least two virtual servers and at least two storage servers, any one of the at least two virtual servers manages one or more of the at least two storage servers, each of the one or more storage servers is divided into at least one partition, each of the at least one partition is managed by one virtual server, and the cloud platform is configured to execute the virtual server management method provided in the second aspect or the possible implementations of the second aspect.

This embodiment of the present disclosure provides a cloud platform. The cloud platform establishes a distributed database, and determines in advance a correspondence between a partition and a virtual server, and each partition is managed by one virtual server. In this way, a virtual server can implement interlinked storage on partitions managed by the virtual server, and disk utilization is improved.

According to a sixth aspect, a cloud platform is provided, applied to a content delivery system, the content delivery system includes at least two virtual servers and at least two storage servers, any one of the at least two virtual servers manages one or more of the at least two storage servers, each of the one or more storage servers is divided into at least one partition, each of the at least one partition is managed by multiple virtual servers, each partition has multiple hash values, one hash value of each partition corresponds to one virtual server, and the cloud platform is configured to execute the virtual server management method provided in the third aspect or the possible implementations of the third aspect.

This embodiment of the present disclosure provides a cloud platform. The cloud platform establishes a distributed database, and determines in advance a correspondence between a hash value of a partition and a virtual server, and each partition is managed by multiple virtual servers, achieving distributed processing for content delivery.

According to another aspect, an embodiment of the present disclosure provides a virtual server, applied to a content delivery system, where the content delivery system includes at least two virtual servers and at least two storage servers, any one of the at least two virtual servers manages one or more of the at least two storage servers, and the any virtual server is used as a first virtual server and includes a receiving unit configured to receive a first request message sent by a content requester, where the first request message carries a first URL of user-requested content, a judging unit configured to determine, according to a cache list maintained by the first virtual server, that one of the storage servers managed by the first virtual server has cached the content corresponding to the first URL received by the receiving unit, and a redirection unit configured to redirect the first request message received by the receiving unit to a first storage server that is recorded in the cache list and that has cached the content corresponding to the first URL, where the first request message redirected to the first storage server is used to instruct the first storage server to send the cached content corresponding to the first URL to the content requester.

In a possible design, the receiving unit is further configured to receive a second request message sent by the content requester, where the second request message carries a second URL of user-requested content, the judging unit is further configured to determine, according to the cache list maintained by the first virtual server, that none of the storage servers managed by the first virtual server caches the content corresponding to the second URL carried in the second request message, the virtual server further includes a determining unit configured to determine, according to a consistent hashing algorithm, a second storage server configured to cache the content corresponding to the second URL carried in the second request message received by the receiving unit, and the redirection unit is further configured to redirect the second request message received by the receiving unit to the second storage server, where the second request message redirected to the second storage server is used to instruct the second storage server to retrieve the user-requested content and send the retrieved user-requested content to the content requester.

In a possible design, the virtual server further includes a determining unit configured to determine, according to the first URL, carried in the first request message received by the receiving unit, of the user-requested content, that the first virtual server processes the first URL before the judging unit determines, according to the cache list maintained by the first virtual server, that one of the storage servers managed by the first virtual server has cached the content corresponding to the first URL.

In a possible design, the determining unit is further configured to determine, according to the second URL, carried in the second request message received by the receiving unit, of the user-requested content, that the first virtual server processes the second URL before the judging unit determines, according to the cache list maintained by the first virtual server, that none of the storage servers managed by the first virtual server caches the content corresponding to the second URL carried in the second request message.

In a possible design, the receiving unit is further configured to receive a third request message sent by the content requester, where the third request message carries a third URL of user-requested content, the determining unit is further configured to determine, according to the third URL, carried in the third request message received by the receiving unit, of the user-requested content, that a second virtual server processes the third URL, and the redirection unit is further configured to redirect the third request message received by the receiving unit to the second virtual server.

In a possible design, the determining unit includes a hash value computation subunit configured to compute, according to a URL, carried in a request message received by the receiving unit, of user-requested content, a hash value of the URL, a partition determining subunit configured to obtain hash values of all partitions in a distributed database, and query, based on the consistent hashing algorithm according to the hash value of the URL that is computed by the hash value computation subunit, for a partition corresponding to the URL, where each of the storage servers included in the content delivery system is divided into at least one partition, and a virtual server determining subunit configured to determine, according to a hash value of the partition determined by the partition determining subunit and corresponding to the URL and a correspondence stored in the distributed database between a hash value of a partition and a hash value of a virtual server, the virtual server processing the URL.

In a possible design, each of the storage servers included in the content delivery system is divided into at least one partition, and the virtual server further includes an update unit configured to update popularity information corresponding to the second URL after the redirection unit redirects the second request message received by the receiving unit to the second storage server, the determining unit is further configured to determine, according to the popularity information updated by the update unit, that the content corresponding to the second URL needs to be cached, and determine that a storage capacity of a partition corresponding to the second URL is not full, and the virtual server further includes a notification unit configured to instruct the second storage server to cache the content corresponding to the second URL into the partition corresponding to the second URL.

In a possible design, each partition corresponds to one virtual server, the determining unit is further configured to determine that the storage capacity of the partition corresponding to the second URL is full, determine that a storage capacity of at least one of multiple partitions managed by the first virtual server is not full, and select a partition whose storage capacity is not full, the notification unit is further configured to instruct the second storage server to cache the content corresponding to the second URL into the selected partition, the virtual server further includes an addition unit configured to add a hash value of the second URL, a hash value of the partition caching the content corresponding to the second URL, and the popularity information corresponding to the second URL to a record of a cache queue, the determining unit is further configured to determine that the storage capacity of the partition corresponding to the second URL is full, determine that storage capacities of the multiple partitions managed by the first virtual server are all full, and query the cache queue for a record whose popularity is lower than a first threshold, and the notification unit is further configured to instruct, according to the record found by the determining unit, a storage server corresponding to a partition in the record to delete content corresponding to a URL in the record.

In a possible design, each partition has multiple hash values, and one hash value of each partition corresponds to one virtual server, the receiving unit is further configured to receive notification information that is reported when the storage capacity of the partition corresponding to the second URL is full and that indicates that the partition is full after the redirection unit redirects the second request message to the second storage server, where the notification information is reported by the second storage server to which the partition belongs to multiple virtual servers managing the partition, and the notification unit is further configured to send a deletion notification to the second storage server, where the deletion notification carries a URL of content that is in the partition managed by the first virtual server and whose popularity lower than a second threshold, and the deletion notification is used to instruct the second storage server to determine, according to popularity information of the content corresponding to the URL carried in the deletion notification, whether to delete the content corresponding to the URL carried in the deletion notification.

According to another aspect, an embodiment of the present disclosure provides a virtual server management apparatus, applied to a content delivery system, where the content delivery system includes at least two virtual servers and at least two storage servers, any one of the at least two virtual servers manages one or more of the at least two storage servers, each of the one or more storage servers is divided into at least one partition, each of the at least one partition is managed by one virtual server, and the apparatus includes a computation unit configured to compute a hash value of each partition of the content delivery system and a hash value of each virtual server of the content delivery system, a determining unit configured to determine, according to a consistent hashing algorithm or a random selection manner, a virtual server corresponding to each partition, and an establishment unit configured to establish a distributed database, and store a correspondence between a hash value of a partition and a hash value of a virtual server in the distributed database.

In a possible design, the determining unit is further configured to determine, according to load of the content delivery system, that a virtual server needs to be newly added, and determine a quantity of partitions needing to be allocated to the newly added virtual server, the apparatus further includes a selection unit configured to select a partition whose quantity is the quantity determined by the determining unit from all partitions, a deletion unit configured to instruct a storage server to delete content in the partition selected by the selection unit, and an update unit configured to allocate the partition selected by the selection unit to the newly added virtual server, and update a correspondence between a partition and a virtual server in the distributed database, the determining unit is further configured to determine, according to load of the content delivery system, that a virtual server needs to be removed, the deletion unit is further configured to instruct a storage server to delete content in a partition corresponding to the to-be-removed virtual server, the update unit is further configured to allocate the partition corresponding to the to-be-removed virtual server to another virtual server, and update the correspondence between a partition and a virtual server, and the deletion unit is further configured to delete the to-be-removed virtual server.

According to another aspect, a virtual server management apparatus is provided, applied to a content delivery system, where the content delivery system includes at least two virtual servers and at least two storage servers, any one of the at least two virtual servers manages one or more of the at least two storage servers, each of the one or more storage servers is divided into at least one partition, each of the at least one partition is managed by multiple virtual servers, each partition has multiple hash values, one hash value of each partition corresponds to one virtual server, and the apparatus includes a computation unit configured to compute a hash value of each partition of the content delivery system and a hash value of each virtual server of the content delivery system, a determining unit configured to determine, according to a consistent hashing algorithm or a random selection manner, multiple virtual servers corresponding to each partition, and an establishment unit configured to establish a distributed database, and store a correspondence between a hash value of a partition and a hash value of a virtual server in the distributed database.

In a possible design, the determining unit is further configured to determine, according to load of the content delivery system, that a virtual server needs to be newly added, the computation unit is further configured to compute a hash value of the newly added virtual server, the apparatus further includes an obtaining unit configured to obtain all hash values of all partitions, an allocation unit configured to allocate a hash value of a corresponding partition to the newly added virtual server based on the consistent hashing algorithm, a deletion unit configured to instruct a storage server to delete content in a cache queue of a virtual server originally corresponding to the allocated hash value of the partition, and an update unit configured to allocate the selected hash value of the partition to the newly added virtual server, and update a correspondence between a hash value of a partition and a virtual server in the distributed database, the determining unit is further configured to determine, according to load of the content delivery system, that a virtual server needs to be removed, and determine a hash value, corresponding to the to-be-removed virtual server, of a partition, the determining unit is further configured to instruct a storage server to delete content that is in the partition corresponding to the to-be-removed virtual server and that belongs to a cache queue of the virtual server, the update unit is further configured to allocate the hash value, corresponding to the to-be-removed virtual server, of the partition to another virtual server, and update the correspondence between a hash value of a partition and a virtual server, and the deletion unit is further configured to delete the to-be-removed virtual server.

According to another aspect, an embodiment of the present disclosure provides a virtual server, applied to a content delivery system, where the content delivery system includes at least two virtual servers and at least two storage servers, any one of the at least two virtual servers manages one or more of the at least two storage servers, and the any virtual server is used as a first virtual server and includes a memory and a processor, the memory is configured to store a program instruction, and the processor is configured to, according to the program instruction stored in the memory, enable the processor or the first virtual server to perform the following operations of receiving, by the first virtual server, a first request message sent by a content requester, where the first request message carries a first URL of user-requested content, determining, by the first virtual server according to a cache list maintained by the first virtual server, that one of the storage servers managed by the first virtual server has cached the content corresponding to the first URL, and redirecting the first request message to a first storage server that is recorded in the cache list and that has cached the content corresponding to the first URL, where the first request message redirected to the first storage server is used to instruct the first storage server to send the cached content corresponding to the first URL to the content requester.

In a possible design, the processor is further configured to, according to the program instruction stored in the memory, enable the processor or the first virtual server to perform the following operations of receiving, by the first virtual server, a second request message sent by the content requester, where the second request message carries a second URL of user-requested content, determining, by the first virtual server according to the cache list maintained by the first virtual server, that none of the storage servers managed by the first virtual server caches the content corresponding to the second URL carried in the second request message, determining, by the first virtual server according to a consistent hashing algorithm, a second storage server configured to cache the content corresponding to the second URL carried in the second request message, and redirecting the second request message to the second storage server, where the second request message redirected to the second storage server is used to instruct the second storage server to retrieve the user-requested content and send the retrieved user-requested content to the content requester.

In a possible design, the processor is further configured to, according to the program instruction stored in the memory, enable the processor or the first virtual server to perform the following operation of determining, by the first virtual server according to the first URL, carried in the first request message, of the user-requested content, that the first virtual server processes the first URL before determining, by the first virtual server according to a cache list maintained by the first virtual server, that one of the storage servers managed by the first virtual server has cached the content corresponding to the first URL.

In a possible design, the processor is further configured to, according to the program instruction stored in the memory, enable the processor or the first virtual server to perform the following operation of determining, by the first virtual server according to the second URL, carried in the second request message, of the user-requested content, that the first virtual server processes the second URL before determining, by the first virtual server according to the cache list maintained by the first virtual server, that none of the storage servers managed by the first virtual server caches the content corresponding to the second URL carried in the second request message.

In a possible design, the processor is further configured to, according to the program instruction stored in the memory, enable the processor or the first virtual server to perform the following operations of receiving, by the first virtual server, a third request message sent by the content requester, where the third request message carries a third URL of user-requested content, determining, by the first virtual server according to the third URL, carried in the third request message, of the user-requested content, that a second virtual server processes the third URL, and redirecting the third request message to the second virtual server.

In a possible design, an operation, performed by the processor or the first virtual server, of determining, by the first virtual server according to a URL, carried in a request message, of user-requested content, a virtual server processing the URL includes computing, by the first virtual server according to the URL, carried in the request message, of the user-requested content, a hash value of the URL, obtaining hash values of all partitions in a distributed database, and querying, based on the consistent hashing algorithm according to the hash value of the URL, for a partition corresponding to the URL, where each of the storage servers included in the content delivery system is divided into at least one partition, and determining, according to a hash value of the partition corresponding to the URL and a correspondence stored in the distributed database between a hash value of a partition and a hash value of a virtual server, the virtual server processing the URL.

In a possible design, each of the storage servers included in the content delivery system is divided into at least one partition, and the processor is further configured to according to the program instruction stored in the memory, enable the processor or the first virtual server to perform the following operations of updating, by the first virtual server, popularity information corresponding to the second URL after redirecting the second request message to the second storage server, determining, according to the popularity information, that the content corresponding to the second URL needs to be cached, determining that a storage capacity of a partition corresponding to the second URL is not full, and instructing the second storage server to cache the content corresponding to the second URL into the partition corresponding to the second URL.

In a possible design, each partition corresponds to one virtual server, and the processor is further configured to, according to the program instruction stored in the memory, enable the processor or the first virtual server to perform the following operations of determining, by the first virtual server, that the storage capacity of the partition corresponding to the second URL is full, determining that a storage capacity of at least one of multiple partitions managed by the first virtual server is not full, and selecting a partition whose storage capacity is not full, instructing, by the first virtual server, the second storage server to cache the content corresponding to the second URL into the selected partition, and adding a hash value of the second URL, a hash value of the partition caching the content corresponding to the second URL, and the popularity information corresponding to the second URL to a record of a cache queue, or determining, by the first virtual server, that the storage capacity of the partition corresponding to the second URL is full, determining that storage capacities of the multiple partitions managed by the first virtual server are all full, and querying the cache queue for a record whose popularity is lower than a first threshold, and instructing, according to the found record, a storage server corresponding to a partition in the record to delete content corresponding to a URL in the record.

In a possible design, each partition has multiple hash values, one hash value of each partition corresponds to one virtual server, and the processor is further configured to, according to the program instruction stored in the memory, enable the processor or the first virtual server to perform the following operations of receiving, by the first virtual server, notification information that is reported when the storage capacity of the partition corresponding to the second URL is full and that indicates that the partition is full, where the notification information is reported by the second storage server to which the partition belongs to multiple virtual servers managing the partition after redirecting the second request message to the second storage server, and sending, by the first virtual server, a deletion notification to the second storage server, where the deletion notification carries a URL of content that is in the partition managed by the first virtual server and whose popularity lower than a second threshold, and the deletion notification is used to instruct the second storage server to determine, according to popularity information of the content corresponding to the URL carried in the deletion notification, whether to delete the content corresponding to the URL carried in the deletion notification.

According to another aspect, a cloud platform is provided, applied to a content delivery system, where the content delivery system includes at least two virtual servers and at least two storage servers, any one of the at least two virtual servers manages one or more of the at least two storage servers, each of the one or more storage servers is divided into at least one partition, each of the at least one partition is managed by one virtual server, and the cloud platform includes a memory and a processor, the memory is configured to store a program instruction, and the processor is configured to, according to the program instruction stored in the memory, enable the processor or the cloud platform to perform the following operations of computing, by a cloud platform, a hash value of each partition of the content delivery system and a hash value of each virtual server of the content delivery system, determining, according to a consistent hashing algorithm or a random selection manner, a virtual server corresponding to each partition, and establishing a distributed database, and storing a correspondence between a hash value of a partition and a hash value of a virtual server in the distributed database.

In a possible design, the processor is further configured to, according to the program instruction stored in the memory, enable the processor or the cloud platform to perform the following operations of determining, by the cloud platform according to load of the content delivery system, that a virtual server needs to be newly added, determining a quantity of partitions needing to be allocated to the newly added virtual server, selecting a partition whose quantity is the quantity from all partitions, instructing a storage server to delete content in the selected partition, and allocating the selected partition to the newly added virtual server, and updating a correspondence between a partition and a virtual server in the distributed database, or determining, by the cloud platform according to load of the content delivery system, that a virtual server needs to be removed, instructing, by the cloud platform, a storage server to delete content in a partition corresponding to the to-be-removed virtual server, allocating the partition corresponding to the to-be-removed virtual server to another virtual server, and updating the correspondence between a partition and a virtual server, and deleting the to-be-removed virtual server.

According to another aspect, a cloud platform is provided, applied to a content delivery system, where the content delivery system includes at least two virtual servers and at least two storage servers, any one of the at least two virtual servers manages one or more of the at least two storage servers, each of the one or more storage servers is divided into at least one partition, each of the at least one partition is managed by multiple virtual servers, each partition has multiple hash values, one hash value of each partition corresponds to one virtual server, and the cloud platform includes a memory and a processor, the memory is configured to store a program instruction, and the processor is configured to, according to the program instruction stored in the memory, enable the processor or the cloud platform to perform the following operations of computing, by a cloud platform, a hash value of each partition of the content delivery system and a hash value of each virtual server of the content delivery system, determining, according to a consistent hashing algorithm or a random selection manner, multiple virtual servers corresponding to each partition, and establishing a distributed database, and storing a correspondence between a hash value of a partition and a hash value of a virtual server in the distributed database.

In a possible design, the processor is further configured to, according to the program instruction stored in the memory, enable the processor or the cloud platform to perform the following operations of determining, by the cloud platform according to load of the content delivery system, that a virtual server needs to be newly added, computing, by the cloud platform, a hash value of the newly added virtual server, obtaining all hash values of all partitions, allocating a hash value of a corresponding partition to the newly added virtual server based on the consistent hashing algorithm, instructing a storage server to delete content in a cache queue of a virtual server originally corresponding to the allocated hash value of the partition, and allocating the selected hash value of the partition to the newly added virtual server, and updating a correspondence between a hash value of a partition and a virtual server in the distributed database, or determining, by the cloud platform according to load of the content delivery system, that a virtual server needs to be removed, determining, by the cloud platform, a hash value, corresponding to the to-be-removed virtual server, of a partition, instructing a storage server to delete content that is in the partition corresponding to the to-be-removed virtual server and that belongs to a cache queue of the virtual server, allocating the hash value, corresponding to the to-be-removed virtual server, of the partition to another virtual server, and updating the correspondence between a hash value of a partition and a virtual server, and deleting the to-be-removed virtual server.

According to another aspect, an embodiment of the present disclosure provides a cloud platform. The cloud platform has a function of performing actual behaviors of a cloud platform in the foregoing method. The function may be implemented by hardware, or may be implemented by hardware executing corresponding software. The hardware or software includes one or more modules corresponding to the foregoing function.

In a possible design, a structure of the cloud platform includes a processor and a transmitter, and the processor is configured to support the cloud platform to perform corresponding functions in the foregoing method. The transmitter is configured to support the cloud platform to communicate with a storage server to send, to the storage server, information or an instruction in the foregoing method. The cloud platform may further include a memory, and the memory is coupled to the processor, and stores a program instruction and data necessary to the cloud platform.

According to still another aspect, an embodiment of the present disclosure provides a storage server. The storage server has a function of performing behaviors of a storage server in the foregoing method design. The function may be implemented by hardware, or may be implemented by hardware executing corresponding software. The hardware or software includes one or more modules corresponding to the foregoing function. The module may be software and/or hardware.

In a possible design, a structure of the storage server includes a receiver and a processor, and the receiver is configured to support the storage server to receive instructions such as a request message redirected by the foregoing cloud platform. The processor controls the storage server to send, to a content requester according to the request message received by the receiver, content cached in a partition of the storage server, or first retrieve content corresponding to a URL carried in the request message, and then send the obtained content to the content requester.

According to yet another aspect, an embodiment of the present disclosure provides a computer storage medium configured to store a computer software instruction used by the foregoing cloud platform, including a program designed for executing the foregoing aspect.

According to yet another aspect, an embodiment of the present disclosure provides a computer storage medium configured to store a computer software instruction used by the foregoing storage server, including a program designed for executing the foregoing aspect.

Compared with the other approaches, solutions provided in the present disclosure can greatly improve content I/O performance of a CDN that is based on cloud computing.

DESCRIPTION OF EMBODIMENTS

To make the purpose, technical solutions, and advantages of the embodiments of the present disclosure clearer, the following clearly describes the technical solutions of the embodiments of the present disclosure with reference to the accompanying drawings in the embodiments of the present disclosure.

Figure 1:
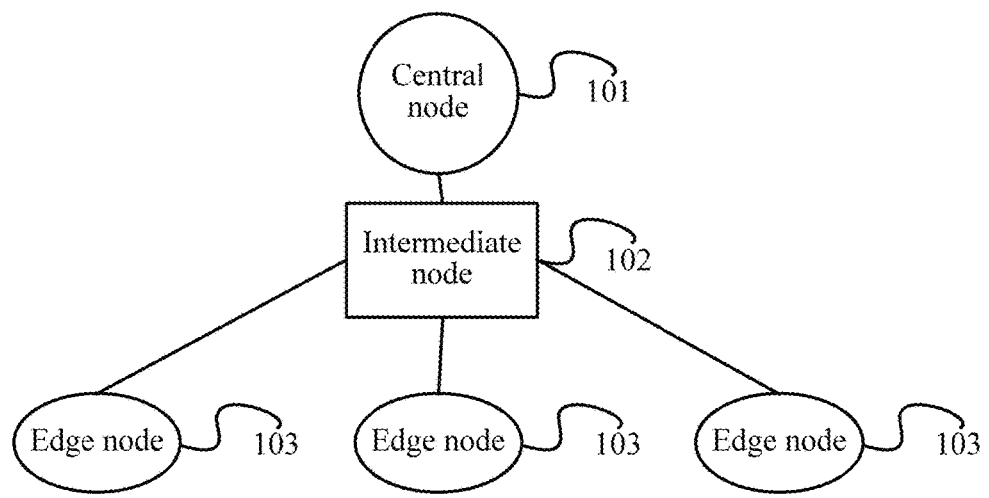
FIG. 1 is a schematic architectural diagram of a CDN system according to an embodiment of the present disclosure.

FIG. 1 is a schematic architectural diagram of a CDN system according to an embodiment of the present disclosure. Referring to FIG. 1, the CDN system includes a central node 101, an intermediate node 102, and an edge node 103. Each layer may be provided with one or more nodes. One central node is shown in FIG. 1, which is merely an example and does not limit a quantity of central nodes in this embodiment of the present disclosure. Usually, the central node 101 caches all content in the CDN system, the intermediate node 102 caches a part of the content in the central node 101, and the edge node 103 caches a part of the content in the intermediate node 102. An access request for content is usually redirected first to the edge node 103. If the edge node 103 has cached the content to be accessed using the access request, the edge node 103 directly sends the content to a content requester. If the edge node 103 does not cache the content to be accessed using the access request, the edge node 103 needs to first obtain the content from an upper-layer node of the edge node 103, and then send the obtained content to the content requester. Redirection means re-determining directions for various network requests using various methods, and transferring the network requests to other locations (for example, web page redirection and domain name redirection, and routing change is redirection of a data packet in terms of path).

In this embodiment of the present disclosure, the intermediate node 102 is referred to as an upper-layer node of the edge node 103, and the central node 101 is referred to as an upper-layer node of the intermediate node 102. If the intermediate node 102 does not cache the content to be accessed using the access request either, the intermediate node 102 needs to first obtain the content from the upper-layer node of the intermediate node 102, and then send the obtained content to the edge node 103.

To overcome a problem of relatively poor I/O performance of a CDN system that is based on cloud computing, in this embodiment of the present disclosure, composition of each CDN node is improved. The CDN node herein may be a central node, an intermediate node, or an edge node. Because an access request of a user is usually redirected first to an edge node, this embodiment of the present disclosure is described using only the edge node in the CDN system as an example. Composition of another CDN node and a content delivery method are similar thereto. For brevity, details are not described herein.

In this embodiment of the present disclosure, the edge node in the CDN system is implemented using a virtual server created using a cloud computing technology and an independent storage server. A computation capability and a storage capability of the servers are separated, the computation capability is implemented using a virtualization technology of cloud computing, and the storage capability is implemented using the independent storage server. Each virtual server may access one or more storage servers. The storage server is a physical server, and performs content I/O without the virtual server, and I/O performance of the CDN system is greatly improved.

Figure 2:
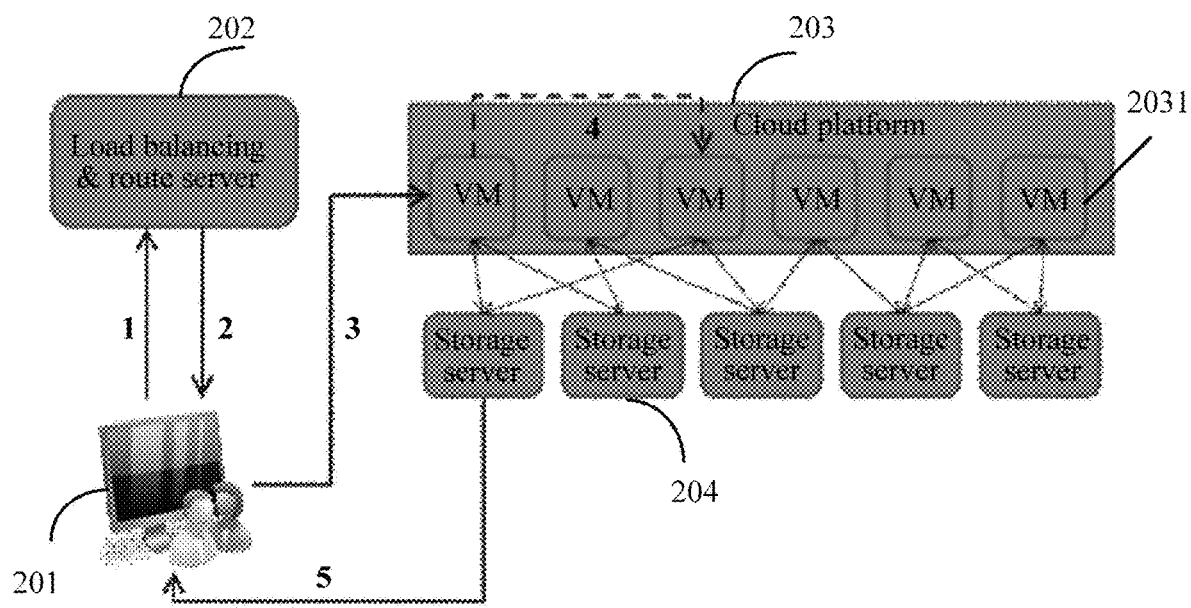
FIG. 2 is a schematic diagram of a network architecture on which a content delivery method according to an embodiment of the present disclosure is based.

FIG. 2 is a schematic diagram of a network architecture on which a content delivery method according to an embodiment of the present disclosure is based. Referring to FIG. 2, network elements in the present disclosure include user equipment (UE) 201, a load balancing and route server 202, a cloud platform 203, and a storage server 204. Multiple virtual machines (designated as VM) 2031 may be created on the cloud platform 203 according to a requirement. Each VM 2031 is used as one virtual server. The virtual machine 2031 and the storage server 204 jointly constitute a cluster server node in a CDN system. A cluster server node in FIG. 2 is used as an edge node in the CDN system. A person skilled in the art may be aware that a same cluster server node may also be used as a central node or an intermediate node. This embodiment of the present disclosure is described using only the edge node in the CDN system as an example.

An embodiment of the present disclosure provides a cloud platform. The cloud platform has a function of performing actual behaviors of a cloud platform in a content delivery method and a virtual server management method that are provided in embodiments of the present disclosure. The function may be implemented by hardware, or may be implemented by hardware executing corresponding software. The hardware or software includes one or more modules corresponding to the foregoing function.

In a possible design, a structure of the cloud platform includes a processor and a transmitter, and the processor is configured to support the cloud platform to perform corresponding functions in the foregoing methods. The transmitter is configured to support the cloud platform to communicate with a storage server to send, to the storage server, information or an instruction in the foregoing methods. The cloud platform may further include a memory, and the memory is coupled to the processor, and stores a program instruction and data necessary to the cloud platform. The cloud platform may further include a receiver, and the receiver is configured to receive a request message sent by UE.

An embodiment of the present disclosure provides a storage server. The storage server has a function of performing behaviors of a storage server in the foregoing method design. The function may be implemented by hardware, or may be implemented by hardware executing corresponding software. The hardware or software includes one or more modules corresponding to the foregoing function. The module may be software and/or hardware.

In a possible design, a structure of the storage server includes a receiver and a processor, and the receiver is configured to support the storage server to receive instructions such as a request message redirected by the foregoing cloud platform. The processor controls the storage server to send, to a content requester according to the request message received by the receiver, content cached in a partition of the storage server, or first retrieve content corresponding to a URL carried in the request message, and then send the obtained content to the content requester. The storage server may further include a transmitter, and the transmitter is configured to send content to a content requester.

Based on the network architecture shown in FIG. 2, the content delivery method provided in this embodiment of the present disclosure mainly includes the following processing procedure.

1. A user requests file content from the load balancing and route server 202 according to a file URL using the UE 201.

2. The load balancing and route server 202 redirects the user to a virtual server (also referred to as VM 2031) A on a cloud computing platform according to a route scheduling algorithm. A specific route scheduling algorithm may be based on different selection polices, for example, based on a load status of a virtual server, or based on a responding time of a virtual server. In this embodiment of the present disclosure, the cloud computing platform may be briefly referred to as a cloud platform.

3. The UE 201 requests, from the virtual server A, the file content corresponding to the URL.

4. The virtual server A determines a virtual server B needing to process the URL. If the virtual server A and the virtual server B are not a same virtual server, the user request is redirected to the virtual server B, and the virtual server B processes the user request. If the virtual server A and the virtual server B are a same virtual server, the virtual server B directly processes the user request without redirection.

The virtual server B determines whether the URL is in a cache queue maintained by the virtual server B. If the URL is in the cache queue of the virtual server B, the virtual server B redirects the user request to a storage server C that is recorded in the cache queue and that corresponds to the URL, and instructs the storage server C to deliver the file content corresponding to the URL to the UE 201. If the URL is not in the cache queue of the virtual server B, the virtual server B determines, according to a consistent hashing algorithm, a storage server D corresponding to the URL, redirects the user request to the storage server D corresponding to the URL, and instructs the storage server D to retrieve the file content corresponding to the URL and deliver the file content to the UE 201.

The storage server C and the storage server D may be a same storage server, or may be different storage servers.

5. The storage server C or the storage server D deliveries the file content corresponding to the URL to the UE 201.

This embodiment of the present disclosure provides a content delivery method. A virtual server receives a request message sent by UE, processes a URL, carried in the request message, of user-requested file content according to the URL, and redirects the request message to a storage server corresponding to the URL. The storage server sends cached content corresponding to the URL to the UE. A computation capability and a storage capability of a server cluster are separated, the computation capability is implemented using a virtualization technology of cloud computing, and the storage capability is implemented using an independent storage server such that the storage server may directly send content to UE without a virtual server, and content I/O throughput performance is effectively improved.

Figure 3:
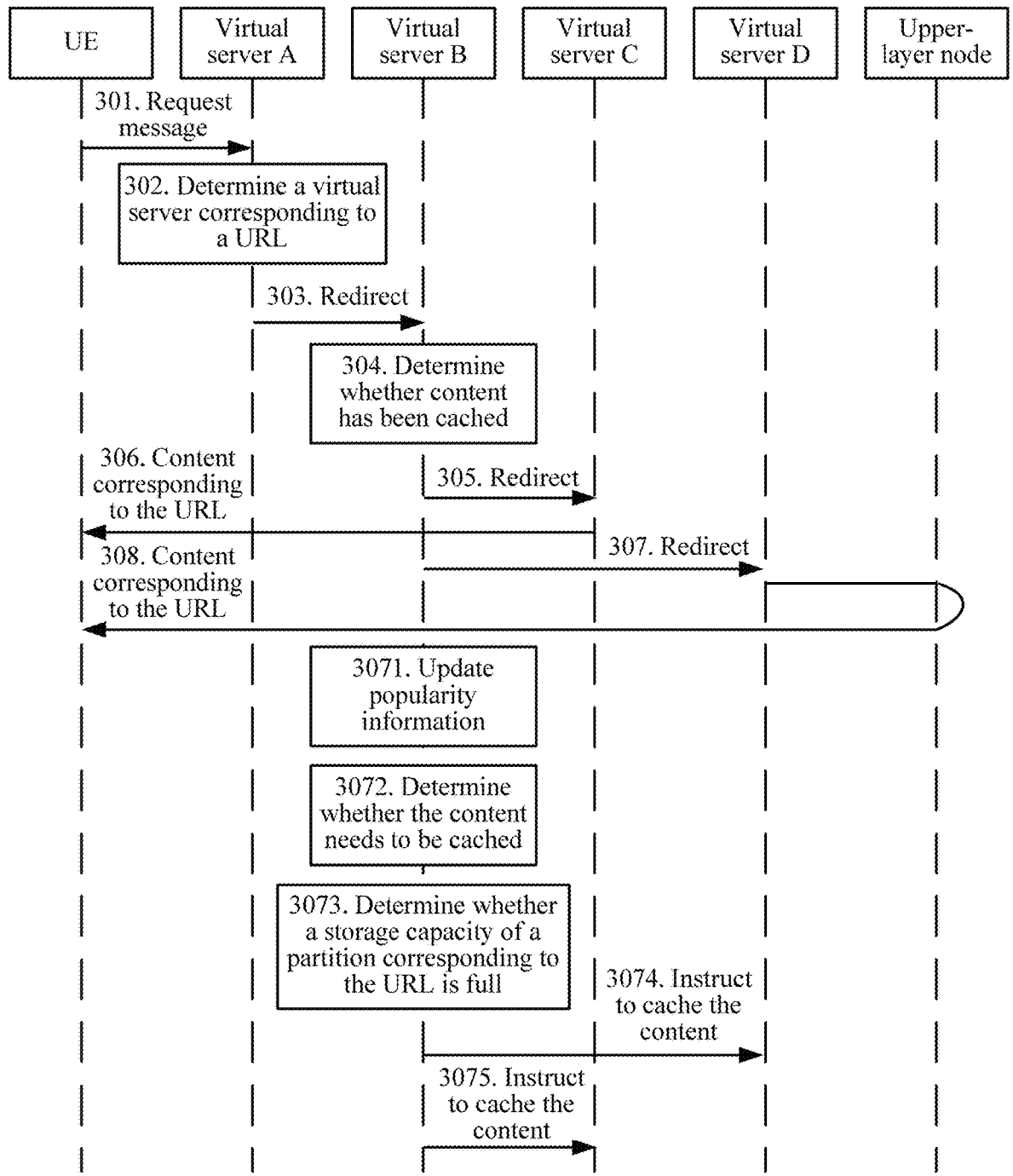
FIG. 3 is a signal flow diagram of a content delivery method according to an embodiment of the present disclosure.

FIG. 3 is a signal flow diagram of a content delivery method according to an embodiment of the present disclosure. Entities in the method mainly include a virtual server and a storage server in a CDN node. The method includes the following steps.

Step 301: A virtual server A receives a request message sent by UE. The request message carries a URL of user-requested content.

In this embodiment of the present disclosure, after receiving the request message sent by the UE, a load balancing and route server redirects the request message to the virtual server A according to a preset policy.

Step 302: The virtual server A determines, according to the URL, a virtual server B processing the URL.

The CDN node includes multiple virtual servers. Each virtual server is responsible for processing some URLs. The virtual server A receiving the request message may be not a virtual server responsible for processing the URL. Therefore, after receiving the request message, the virtual server A further needs to determine, according to the URL carried in the request message, the virtual server B processing the URL.

In this embodiment of the present disclosure, when a CDN system is constructed, a cloud platform establishes a distributed database, and stores a correspondence between a partition and a virtual server in the distributed database. That is, a partition in the correspondence is managed by a corresponding virtual server. A corresponding virtual server may be selected for each partition according to a random selection manner or a consistent hashing algorithm. The determined correspondence is stored in the distributed database for subsequent query. A hash value of a partition is used to identify the partition, and a hash value of a virtual server is used to identify the virtual server.

To determine the virtual server processing the URL, a hash value of the URL may be first computed. Then the distributed database is queried for hash values of all partitions in the CDN node, and a hash value of a partition corresponding to the URL is determined according to the consistent hashing algorithm. Finally, the distributed database is queried according to the hash value of the partition for a hash value of a virtual server that corresponds to the hash value of the partition, thereby determining the virtual server processing the URL. The hash values of all the partitions include a hash value of each of all the partitions, and include each hash value of each partition.

In this embodiment of the present disclosure, quantities of storage servers and virtual servers may be different. That is, a storage server and a virtual server are not necessarily in a one-to-one correspondence. To implement a one-to-multiple correspondence between a virtual server and a storage server, one storage server may be divided into at least one partition. The following two management manners may be used by a virtual server to manage a partition.

In a first management manner, one storage server is divided into at least one partition, and each partition is managed by one virtual server. In this case, the correspondence stored in the distributed database between a partition and a virtual server may be shown in Table 1.

TABLE 1

| | Virtual server | | | |
| --- | --- | --- | --- | --- |
| | A | B | C | D |
| Partition | 00 | 10 | 20 | 30 |

As can be learned from Table 1, when the hash value of the partition corresponding to the URL is 10, it may be known by querying the distributed database that the virtual server processing the URL is the virtual server B.

In a second management manner, one storage server is divided into at least one partition, and each partition is managed by multiple virtual servers. The multiple mentioned in this embodiment of the present disclosure means at least two. In this case, the correspondence stored in the distributed database between a partition and a virtual server may be shown in Table 2.

TABLE 2

| | Virtual server | | | |
| --- | --- | --- | --- | --- |
| | A | B | C | D |
| Partition | 000 | 001 | 20 | 30 |

As can be learned from Table 2, when the hash value of the partition corresponding to the URL is 000, it may be known by querying the distributed database that the virtual server processing the URL is the virtual server A.

In this embodiment of the present disclosure, to implement a one-to-multiple correspondence between a partition and a virtual server, each partition may have multiple hash values, and one hash value of each partition corresponds to one virtual server. A manner for assigning multiple hash values to one partition may be adding a sequence number behind an identifier (ID) of the partition. For example, the partition 000 and the partition 001 in Table 2 correspond to a same partition 00. That is, the partition 00 is managed by two virtual servers, the virtual server A and the virtual server B.

In the first management manner and the second management manner, a same method may be used to determine the virtual server B processing the URL. Further, the virtual server A computes the hash value of the URL according to the URL, queries the distributed database for a hash value of a partition, and determines, according to the consistent hashing algorithm, a hash value of a partition corresponding to the URL, queries the distributed database according to the hash value of the partition corresponding to the URL, for a hash value of a virtual server that corresponds to the hash value of the partition, and determines the found virtual server as the virtual server B processing the URL.

If the virtual server B determined in step 302 and the virtual server A are not a same virtual server, step 303 is performed. If the virtual server B determined in step 302 and the virtual server A are a same virtual server, step 304 is performed.

Step 303: When the virtual server A and the virtual server B are not a same virtual server, the virtual server A redirects the request message to the virtual server B.

Step 304: The virtual server B determines whether a storage server managed by the virtual server B has cached the content corresponding to the URL.

If a determining result in step 304 is that the virtual server B determines that the storage server managed by the virtual server B has cached the content corresponding to the URL, step 305 is performed. If a determining result in step 304 is that the virtual server B determines that the storage server managed by the virtual server B does not cache the content corresponding to the URL, step 307 is performed.

Step 305: When the virtual server B determines that the storage server managed by the virtual server B has cached the content corresponding to the URL, the virtual server B redirects the request message to a storage server that is recorded in a cache queue and that corresponds to the URL (e.g. virtual server C), and sends a first notification message to the storage server corresponding to the URL.

Step 306: The storage server corresponding to the URL sends the cached content corresponding to the URL to the UE according to the request message and the first notification message.

The first notification message is used to indicate to the storage server that the storage server has cached the content corresponding to the URL. Optionally, the first notification message may be not sent to the storage server corresponding to the URL in step 305. Correspondingly, in step 306, the storage server corresponding to the URL determines, according to the request message, whether the storage server has cached the content corresponding to the URL, and when the storage server has cached the content corresponding to the URL, sends the cached content corresponding to the URL to the UE.

Step 307: When the virtual server B determines that the storage server managed by the virtual server B does not cache the content corresponding to the URL, the virtual server B redirects the request message to a storage server that is determined according to a consistent hashing algorithm and that corresponds to the URL (e.g. virtual server D), and sends a second notification message to the storage server corresponding to the URL.

Step 308: The storage server corresponding to the URL retrieves, according to the request message and the second notification message, the content corresponding to the URL, and sends the obtained content corresponding to the URL to the UE.

The second notification message is used to indicate to the storage server that the storage server does not cache the content corresponding to the URL. Optionally, the second notification message may be not sent to the storage server corresponding to the URL in step 307. Correspondingly, in step 308, the storage server corresponding to the URL determines, according to the request message, whether the storage server has cached the content corresponding to the URL, and when the storage server does not cache the content corresponding to the URL, retrieves the content corresponding to the URL, and sends the obtained content corresponding to the URL to the UE.

Retrieving the content corresponding to the URL may include obtaining, from an intermediate node, the content corresponding to the URL or obtaining, from a central node, the content corresponding to the URL.

The content delivery method has different procedures when a virtual server manages a partition in the first management manner and the second management manner. Therefore, the following separately describes the content delivery method in the two management manners.

The content delivery method may further include a content storage processing procedure. In the first management manner, after step 307, the method may further include the following steps.

Step 3071: The virtual server B updates popularity information corresponding to the URL.

Step 3072: Determine, according to the popularity information, whether the content corresponding to the URL needs to be cached.

Step 3073: When the content corresponding to the URL needs to be cached, determine whether a storage capacity of a partition corresponding to the URL is full.

The partition herein corresponding to the URL means a partition that is determined according to the consistent hashing algorithm and that corresponds to the URL.

If a determining result in step 3073 is that the storage capacity of the partition corresponding to the URL is not full, step 3074 is performed. If a determining result in step 3073 is that the storage capacity of the partition corresponding to the URL is full, step 3075 is performed.

Step 3074: When the storage capacity of the partition corresponding to the URL is not full, instruct a storage server to cache the content corresponding to the URL into the partition corresponding to the URL.

In this embodiment of the present disclosure, a storage server D represents a storage server in which the partition corresponding to the URL is located.

Step 3075: When the storage capacity of the partition corresponding to the URL is full, select a partition whose storage capacity is not full among multiple partitions managed by the virtual server B, instruct a storage server to cache the content corresponding to the URL into the selected partition, and add the URL, an ID of the partition caching content corresponding to the URL, and the popularity information corresponding to the URL to a record of the cache queue.

In this embodiment of the present disclosure, a storage server C represents a storage server in which the partition that is selected by the virtual server B and whose storage capacity is not full is located.

The storage server C and the storage server D may be a same storage server, or may be different storage servers.

The content delivery method may further include a content deletion processing procedure. A storage server may report a storage capacity of a partition periodically or in an event-triggered manner to a virtual server managing the partition. In the first management manner, when the virtual server B determines storage capacities of the managed multiple partitions are all full, the virtual server B queries the cache queue for a record whose popularity is lower than a first threshold, and instructs, according to the found record, a storage server corresponding to a partition in the record to delete content corresponding to a URL in the record.

Figure 4:
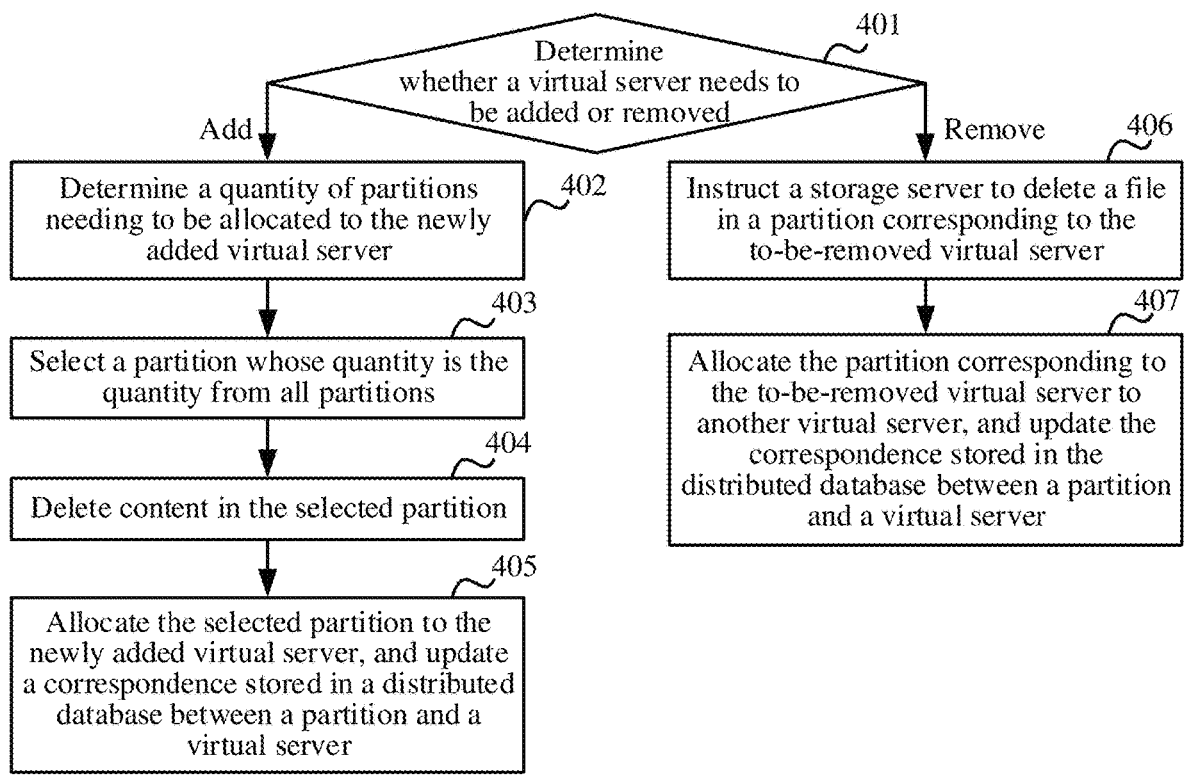
FIG. 4 is a flowchart of a virtual server management method according to an embodiment of the present disclosure.

An embodiment of the present disclosure further provides a virtual server management method. Referring to a flowchart of the virtual server management method shown in FIG. 4, in this embodiment of the present disclosure, a quantity of virtual servers included in an edge node is not constant, and a virtual server may be added or removed according to a load change of a CDN system. The method may be executed by a cloud platform, and is described below using the foregoing first management manner as an example. The method includes the following steps.

Step 401: A cloud platform determines, according to load of a CDN system, whether a virtual server needs to be added or removed.

When a determining result is that a virtual server needs to be added, step 402 is performed. When a determining result is that a virtual server needs to be removed, step 406 is performed.

Step 402: When a virtual server needs to be added, determine a quantity of partitions needing to be allocated to the newly added virtual server.

Step 403: Select a partition whose quantity is the quantity from all partitions.

A partition corresponding to the newly added virtual server may be selected according to a random selection manner or a consistent hashing algorithm.

Step 404: Delete content in the selected partition.

Step 405: Allocate the selected partition to the newly added virtual server, and update a correspondence stored in a distributed database between a partition and a virtual server.

Step 406: When a virtual server needs to be removed, instruct a storage server to delete a file in a partition corresponding to the to-be-removed virtual server.

Step 407: Allocate the partition corresponding to the to-be-removed virtual server to another virtual server, and update the correspondence stored in the distributed database between a partition and a virtual server.

A content storage processing procedure included in the content delivery method in the foregoing second management manner is similar to that in the first management manner. Details are not described herein again.

In the second management manner, the content delivery method may further include a content deletion processing procedure. When the second management manner is used, one partition is managed by multiple virtual servers. Therefore, content to be deleted in a partition needs to be determined according to a result of negotiation among multiple virtual servers, rather than determined by a single virtual server. Further, the method includes when a storage capacity of a partition corresponding to a URL is full, a storage server to which the partition belongs reports, to multiple virtual servers managing the partition, notification information indicating that the partition is full, to notify the virtual servers corresponding to the partition that first-percentage content whose popularity is relatively low needs to be evicted. Each of the multiple virtual servers sends a deletion notification to the storage server. The deletion notification carries a URL of second-percentage content that is in the partition managed by the virtual server and whose popularity is relatively low, and popularity information of the part of content. According to popularity information of content corresponding to a URL carried in each deletion notification, the storage server deletes content corresponding to a URL carried in a deletion notification in which popularity information indicates a lowest popularity.

The popularity information may be further an average popularity, a maximum popularity, or a minimum popularity. In this embodiment of the present disclosure, the second percentage may be set less than the first percentage such that the virtual server may send multiple deletion notifications, and content whose popularity is relatively low is deleted relatively precisely.

Figure 5:
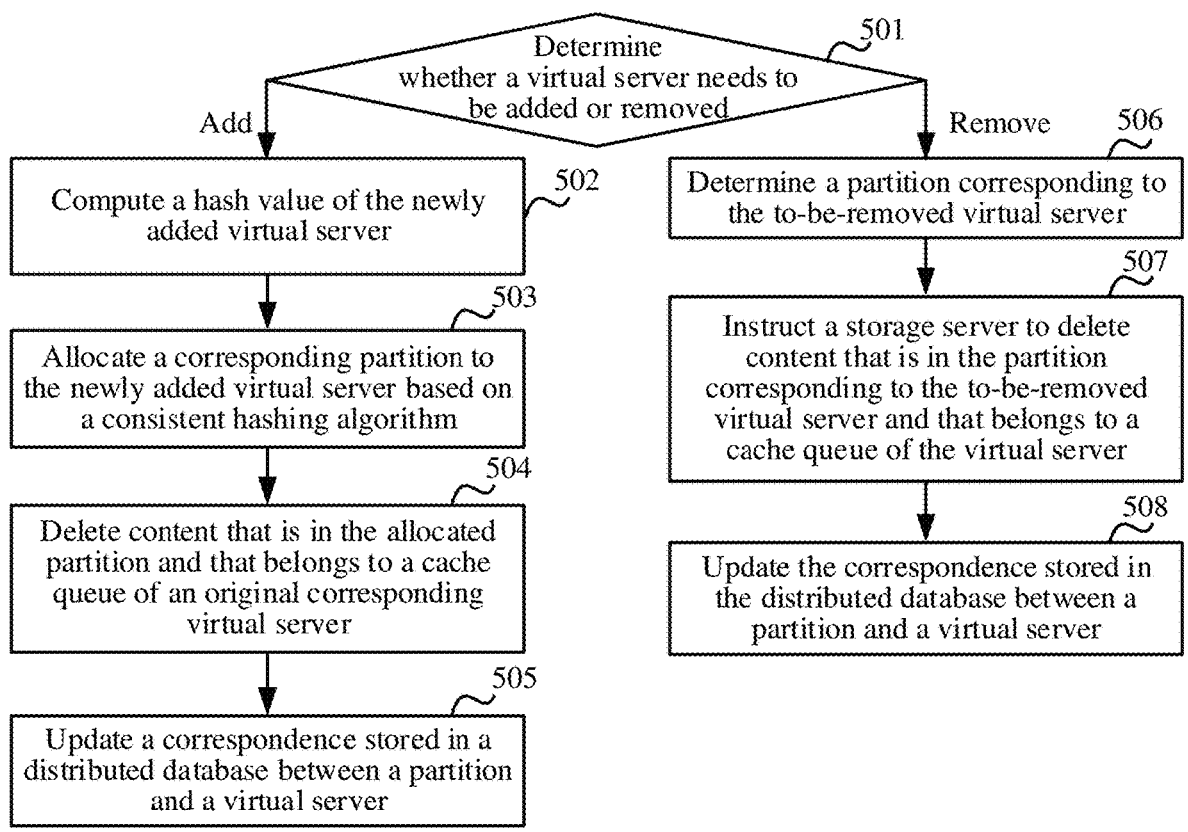
FIG. 5 is a flowchart of another virtual server management method according to an embodiment of the present disclosure.

An embodiment of the present disclosure further provides a virtual server management method. Referring to a flowchart of the virtual server management method shown in FIG. 5, in this embodiment of the present disclosure, slightly different from the first management manner, in the second management manner, the method includes the following steps.

Step 501: A cloud platform determines, according to load of a CDN system, whether a virtual server needs to be added or removed.

When a determining result is that a virtual server needs to be added, step 502 is performed. When a determining result is that a virtual server needs to be removed, step 506 is performed.

Step 502: When a virtual server needs to be added, compute a hash value of the newly added virtual server.

Step 503: Allocate a corresponding partition to the newly added virtual server based on a consistent hashing algorithm.

Step 504: Delete content that is in the allocated partition and that belongs to a cache queue of an original corresponding virtual server.

Step 505: Update a correspondence stored in a distributed database between a partition and a virtual server.

Different from the first management manner, in step 505, updating the correspondence is relatively simple. Only a correspondence between a hash value of a partition and a hash value of a virtual server needs to be added. Because the partition may be managed by multiple virtual servers, a correspondence between the partition and another virtual server does not need to be deleted.

Step 506: When a virtual server needs to be removed, determine a partition corresponding to the to-be-removed virtual server.

Step 507: Instruct a storage server to delete content that is in the partition corresponding to the to-be-removed virtual server and that belongs to a cache queue of the virtual server.

Step 508: Update the correspondence stored in the distributed database between a partition and a virtual server.

Figure 6:
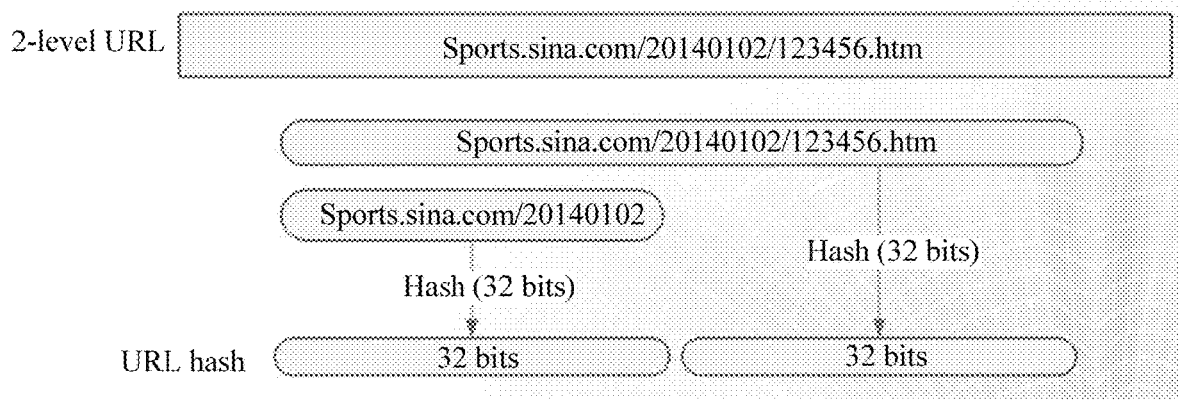
FIG. 6 is a schematic diagram of a hash value generation method.

A hash value of a URL, a hash value of a partition, and a hash value of a server are mentioned in this embodiment of the present disclosure. Description is provided below using the hash value of the URL as an example. A content ID in a CDN system is a URL corresponding to content. Usually, to reduce occupied space, in the CDN system, an original character string of the URL is not used, and instead, a hash string of the URL is used to represent the URL. The hash string may also be referred to as a hash value. FIG. 6 is a schematic diagram of a hash value generation method. Referring to FIG. 6, an original URL is segmented, and a binary string of a fixed length is obtained for each segment using any hash algorithm for combination. In FIG. 6, a hash string obtained for the URL is a binary string having a length of 64.

In this embodiment of the present disclosure, a URL distributed processing manner is used. Because billions of URLs are processed in the CDN, when a server cluster, such as a server cluster of an edge node, processes URLs, generally, a distributed processing method is used. Further, an entire URL set is divided into independent URL subsets according to a quantity of servers in the server cluster of the edge node, and each edge server processes only a URL subset corresponding to the edge server. One URL is processed on only one edge server. The processing herein means operations performed by the edge server, such as computing a popularity of a URL corresponding to content, determining whether to cache and caching the corresponding file content, and retrieving the file content corresponding to the URL.

Figure 7:
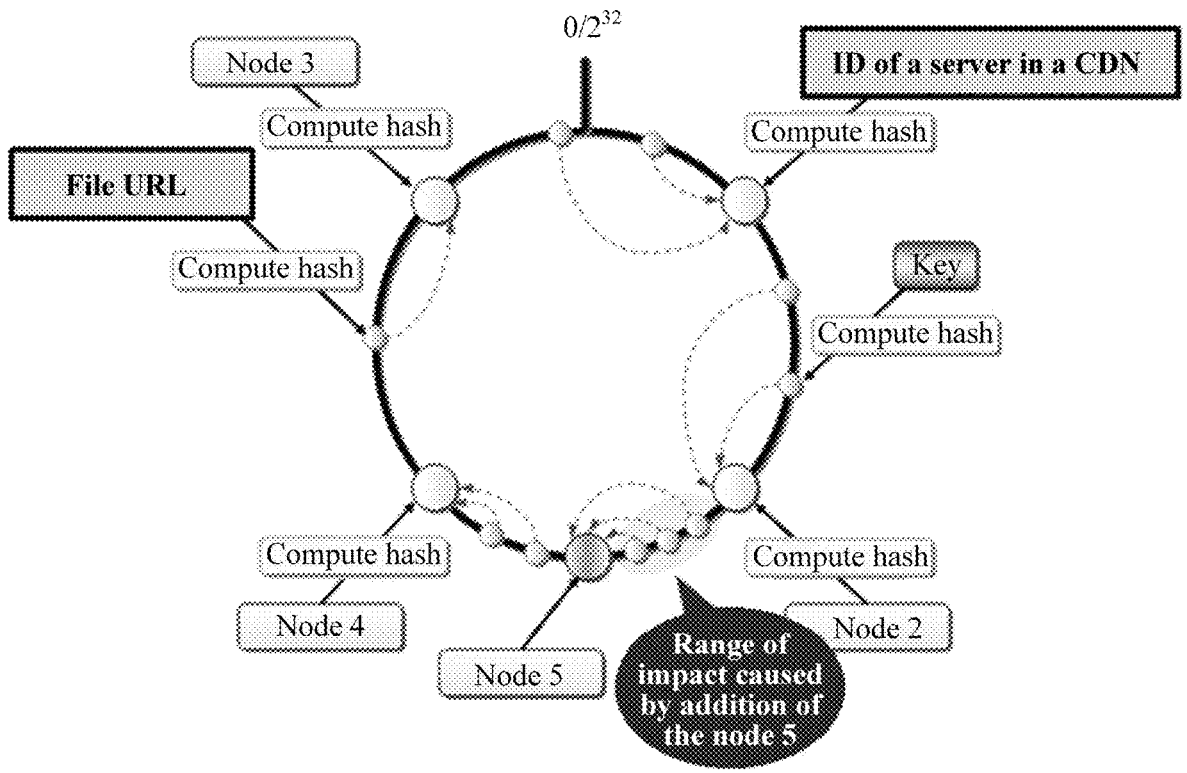
FIG. 7 is a schematic diagram of a method for determining an edge server corresponding to a URL.

An edge server corresponding to a URL may be determined based on a consistent hashing technology. Further, a partition corresponding to the URL may be first determined according to the consistent hashing algorithm, and then the distributed database is queried for a virtual server corresponding to the partition, thereby determining the virtual server corresponding to the URL. Alternatively, if the correspondence stored in the distributed database between a hash value of a partition and a hash value of a virtual server satisfies the consistent hashing algorithm, the virtual server corresponding to the URL may be directly determined according to the consistent hashing algorithm. The following briefly describes the consistent hashing algorithm using the second case as an example. FIG. 7 is a schematic diagram of a method for determining an edge server corresponding to a URL. Referring to FIG. 7, a specific determining method is to perform a hash on IDs of a URL and a server based on a hash algorithm, for example, a murmur algorithm to obtain a hash string of the URL and a hash string of the server. The hash string is usually a binary string. A hash string shown in FIG. 7 has a length of 32 bits, all possible hash strings having a length of 32 form a loop, each point on the loop corresponds to a hash string, and there are 2^32 hash strings in total. Therefore, the hash string of the URL and the hash string of the server each correspond to a point on the loop. Clockwise starting from the point corresponding to the hash string of the URL, the first point corresponding to a hash string of a server is found, and the server is a server processing the URL.

Usually, a quantity of servers is far less than a quantity of URLs. To implement load balance, multiple hash strings are generated for one server. That is, one server corresponds to multiple points on the loop. A method for generating multiple hash strings may be to add a sequence number behind an ID of a server.

Figure 8:
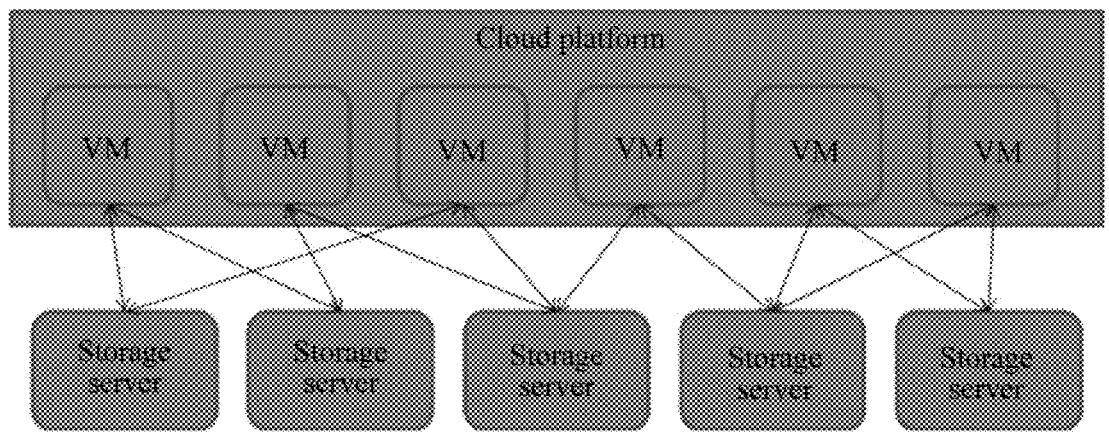
FIG. 8 is a schematic architectural diagram of a server cluster of an edge node according to the present disclosure.

An embodiment of the present disclosure provides an architecture of a server cluster of an edge node. The server cluster of the edge node in a CDN is implemented using a cloud computing technology and an independent storage server. The storage server is implemented using an independent physical server. FIG. 8 is a schematic diagram of an architecture of a server cluster of an edge node according to the present disclosure. Referring to FIG. 8, the architecture is characterized in that a computation capability and a storage capability of the server cluster are separated, the computation capability is implemented using a virtualization technology of cloud computing, and the storage capability is implemented using an independent storage server. Each virtual server may access one or more storage servers.

In this embodiment of the present disclosure, a correspondence between a virtual server and a storage server is relatively flexible, the virtual server and the storage server may be in a one-to-multiple correspondence or a one-to-multiple correspondence, and are not necessarily in the one-to-one correspondence. If the virtual server and the storage server are in a one-to-one correspondence, a quantity of virtual servers needs to be equal to a quantity of storage servers. As a result, when a virtual server needs to be flexibly added and removed, a storage server needs to be added or removed accordingly, affecting dynamic and flexible virtual server addition and removal. Therefore, in this embodiment of the present disclosure, a quantity of storage servers corresponding to one virtual server is not limited, and a quantity of virtual servers corresponding to one storage server is not limited. That is, one storage server may correspond to multiple virtual servers, and one virtual server may correspond to multiple storage servers.

Referring to FIG. 8, in this embodiment of the present disclosure, that the correspondence between a virtual server and a storage server is not necessarily a one-to-one correspondence brings the following advantages. A quantity of virtual servers may be not equal to a quantity of storage servers. Hybrid networking of storage servers having different capacities and different structures is facilitated. When a virtual server is added, a storage space corresponding to the virtual server may be obtained evenly from multiple virtual servers. When a virtual server is removed, a storage space corresponding to the virtual server may be evenly allocated to multiple virtual servers for management. A storage server is prevented from being overloaded because a single virtual server is excessively popular.

Figure 9:
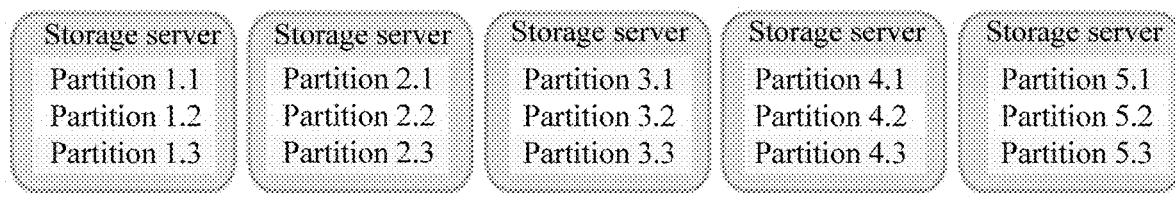
FIG. 9 is a schematic diagram of a partition of a storage server.

To implement the one-to-multiple correspondence between a storage server and a virtual server, a storage capability of the storage server may be partitioned. A partitioning rule may be partitioning based on similar partition sizes according to storage capabilities of different storage servers. FIG. 9 is a schematic diagram of a partition of a storage server. Referring to FIG. 9, each storage server is divided into three partitions. For example, three partitions obtained by dividing a storage server are respectively identified by Partition 1.1, Partition 1.2, and Partition 1.3. A quantity of partitions is at least one, and the quantity 3 of partitions in the figure is merely an example, and does not limit the present disclosure.

In this embodiment of the present disclosure, when the foregoing first management manner is used, each storage partition can be accessed and managed by only one virtual server. A corresponding advantage is that the virtual server can implement interlinked storage on partitions managed by the virtual server, and disk utilization is improved. A corresponding disadvantage is that it is relatively complex to maintain a correspondence between storage of a storage server and a virtual server during virtual server addition and removal.

Figure 10:
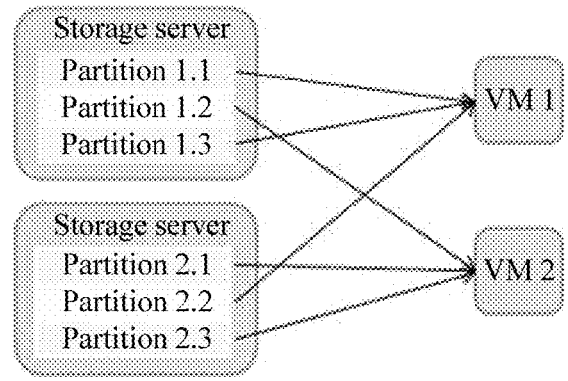
FIG. 10 is a schematic diagram of a correspondence between a storage partition and a virtual server.

For each storage partition, one virtual server may be randomly selected as a virtual server allocated to the storage partition. Alternatively, the virtual server allocated to the storage partition is determined according to a consistent hashing algorithm. A correspondence between a storage partition and a virtual server is stored in a distributed database of the CDN. FIG. 10 is a schematic diagram of a correspondence between a storage partition and a virtual server. Referring to FIG. 10, one partition can be managed by only one virtual server, but one virtual server can manage multiple partitions of multiple storage servers, thereby implementing a one-to-multiple correspondence between a virtual server and a storage server.

The content delivery method provided in this embodiment of the present disclosure is described in detail below using several specific embodiments.

Figure 11:
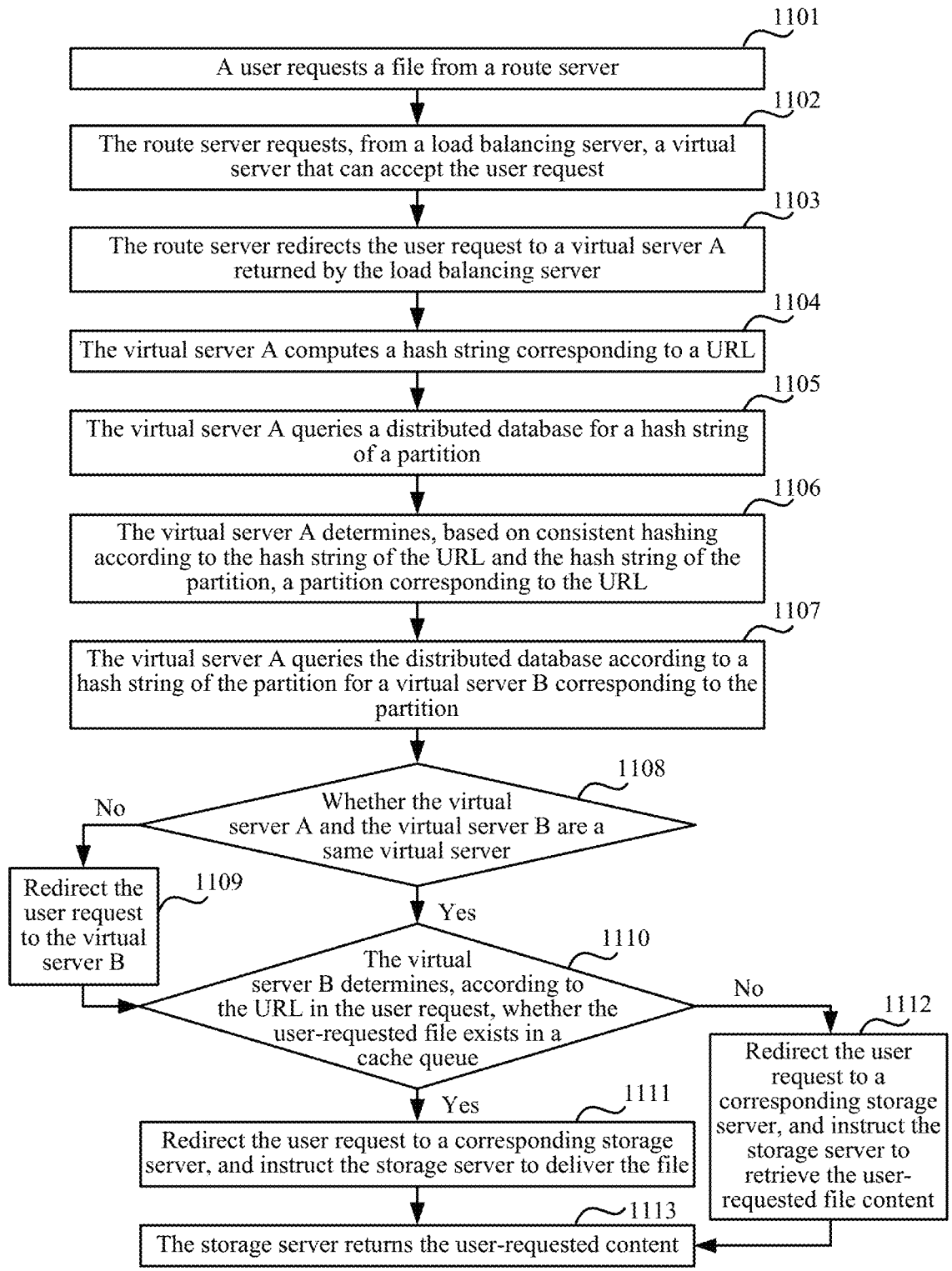
FIG. 11 is a flowchart of a content delivery method according to an embodiment of the present disclosure.

FIG. 11 is a flowchart of a content delivery method according to an embodiment of the present disclosure. This embodiment describes a file delivery procedure performed when a storage space of a storage server in a server cluster of an edge node is partitioned and each partition is managed by one virtual server. The method includes the following steps.

Step 1101: A user requests a file from a route server.

The user may send a request message to the route server using UE. The request message carries a URL of file content that the user wants to obtain.

Step 1102: The route server requests, from a load balancing server, a virtual server that can accept the user request.

In this embodiment of the present disclosure, the route server and the load balancing server may be integrated into one device, and collectively referred to as a load balancing and route server, or the route server and the load balancing server may be disposed separately.

Step 1103: The route server redirects the user request to a virtual server A returned by the load balancing server.

Step 1104: The virtual server A computes a hash string corresponding to a URL.

Step 1105: The virtual server A queries a distributed database for a hash string of a partition.

Step 1106: The virtual server A determines, based on consistent hashing according to the hash string of the URL and the hash string of the partition, a partition corresponding to the URL.

A key technical solution in steps 1104 to 1106 is that a virtual server determines, according to a URL, a partition needing to process the URL such that a storage server processing the URL may be determined.

The virtual server may first determine, according to the URL, a storage partition and a storage server that need to process the URL, and then determine a virtual server corresponding to the URL.

A partition corresponding to a URL is determined based on a consistent hashing algorithm according to the URL. A specific determining method is to perform a hash on IDs of a URL and a storage partition based on a hash algorithm, for example, a murmur algorithm to obtain a hash string of the URL and a hash string of the server. All possible hash strings form a loop, and each point on the loop corresponds to a hash string. Therefore, the hash string of the URL and the hash string of the storage partition each correspond to a point on the loop. Clockwise starting from the point corresponding to the hash string of the URL, the first point corresponding to a hash string of a storage partition is found, and the storage partition is a storage partition used to store, during caching, content corresponding to the URL. A storage server in which the storage partition is located is a storage server processing the URL.

Usually, a quantity of storage partitions is far less than a quantity of URLs. To implement load balance, multiple hash strings are generated for one storage partition, and one storage partition corresponds to multiple points on the loop. A method for generating multiple hash strings may be to add a sequence number behind an ID of a storage partition.

Step 1107: The virtual server A queries the distributed database according to a hash string of the partition for a virtual server B corresponding to the partition.

A key technical solution in step 1107 is that a virtual server determines, according to a URL, a virtual server needing to process the URL.

A correspondence between a storage partition and a virtual server is stored in the distributed database of a CDN. When the distributed database is established, for each storage partition, a virtual server may be randomly selected (such as uniform sampling) as a virtual server allocated to the storage partition. After the storage partition and the storage server that correspond to the URL, the virtual server corresponding to the URL may be obtained according to a correspondence stored in the distributed database between a hash value of a storage partition and a hash value of a virtual server.

Step 1108: If the virtual server A and the virtual server B are a same virtual server, go to step 1110, or otherwise, go to step 1109.

Step 1109: Redirect the user request to the virtual server B.

Step 1110: The virtual server B determines, according to the URL in the user request, whether the user-requested file exists in a cache queue.

Step 1111: If the user-requested file is in the cache queue, redirect the user request to a storage server that is recorded in the cache queue and that corresponds to the URL, and instruct the storage server to deliver the file.

Step 1112: If the user-requested file is not in the cache queue, redirect the user request to a storage server that is determined based on consistent hashing and that corresponds to the URL, and instruct the storage server to retrieve the user-requested file content.

Step 1113: The storage server returns the user-requested content.

Figure 12:
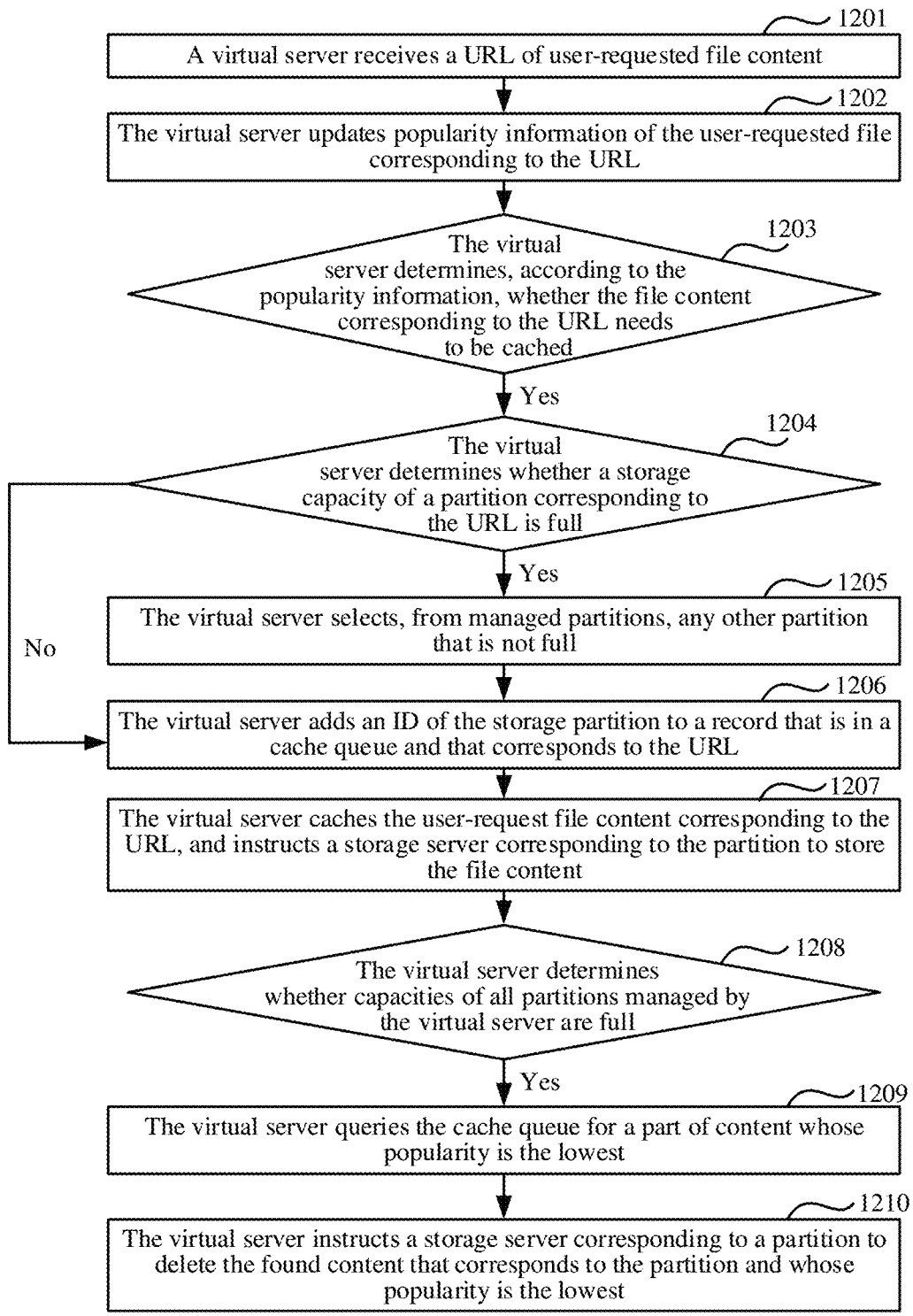
FIG. 12 is a flowchart of another content delivery method according to an embodiment of the present disclosure.

FIG. 12 is a flowchart of a content delivery method according to an embodiment of the present disclosure. This embodiment describes how a virtual server manages file storage and file deletion of a storage server when a storage space of a storage server in a server cluster of an edge node is partitioned and each partition is managed by one virtual server. The method includes the following steps.

Step 1201: A virtual server receives a URL of user-requested file content.

Step 1202: The virtual server updates popularity information of the user-requested file corresponding to the URL.

Step 1203: The virtual server determines, according to the popularity information, whether the file content corresponding to the URL needs to be cached. If yes, go to step 1204. Otherwise, the procedure ends.

Step 1204: The virtual server determines whether a storage capacity of a partition corresponding to the URL is full. If yes, go to step 1205. Otherwise, go to step 1206.

In this embodiment of the present disclosure, a storage server may notify the virtual server of a capacity occupation status of the partition.

Step 1205: The virtual server selects, from managed partitions, any other partition that is not full to store the file content corresponding to the URL.

Step 1206: The virtual server adds an ID of the storage partition to a record that is in a cache queue and that corresponds to the URL.

Step 1207: The virtual server caches the user-request file content corresponding to the URL, and instructs a storage server corresponding to the partition to store the file content.

A key technical solution corresponding to steps 1204 to 1207 is how to store file content in a cache queue on a storage server.

In this embodiment of the present disclosure, one partition can be managed by only one virtual server, but one virtual server may manage multiple partitions. If a virtual server creates one cache queue for one managed partition, and separately manages cache queues using an existing CDN cache management technology, hard disk utilization is low, popularities of partitions are not even, and a hit rate is low.

To avoid the disadvantages, a unified management policy is used in this embodiment of the present disclosure. The virtual server creates only one cache queue for managed multiple partitions. A file in the cache queue is stored in a partition corresponding to a URL of the file. If a storage capacity of a partition corresponding to a URL of a file is full, and capacities of other partitions managed by the virtual server are not full, the file is stored in any one of the other partitions whose capacities are not full, and the storage partition is marked in a record that is in the cache queue and that corresponds to the file. In this way, when a user requests the file content, the user request is redirected to a storage server corresponding to the partition marked in the cache record.

That a storage capacity of a partition is full means that a total size of files stored in the partition is greater than C % the storage capacity, that is, a waterline is reached. A value of C is usually 80 to 85, and is not limited in the present disclosure.

Step 1208: The virtual server determines whether capacities of all partitions managed by the virtual server are full. If yes, go to step 1209. Otherwise, the procedure ends.

A storage server notifies the virtual server of a capacity occupation status of each partition.

Step 1209: The virtual server queries the cache queue for a part of content whose popularity is the lowest.

For example, 5% content whose popularity is the lowest is queried for.

Step 1210: The virtual server instructs a storage server corresponding to a partition to delete the found content that corresponds to the partition and whose popularity is the lowest.

A key technical solution corresponding to steps 1208 to 1210 is how to delete file content from a corresponding storage server when all partitions managed by a virtual server are fully occupied.

A storage server monitors capacity occupation statuses of all partitions of the storage server, and notifies virtual servers corresponding to the partitions of the capacity occupation statuses periodically or in an event-triggered manner. For example, when a capacity of a partition is full, the storage server notifies a virtual server corresponding to the partition that the capacity of the partition is full. When storage capacities of all partitions managed by a virtual server are full, the virtual server queries a cache queue for a part of content whose popularity is the lowest, for example, 5% content whose popularity is the lowest, and instructs a storage server to delete the part of content.

This embodiment of the present disclosure does not limit how a virtual server computes popularity information of a URL corresponding to a user request, and a specific cache queue algorithm. For example, an algorithm such as a common least recent usage (LRU) algorithm or a least frequent usage (LFU) algorithm may be used.

Figure 13:
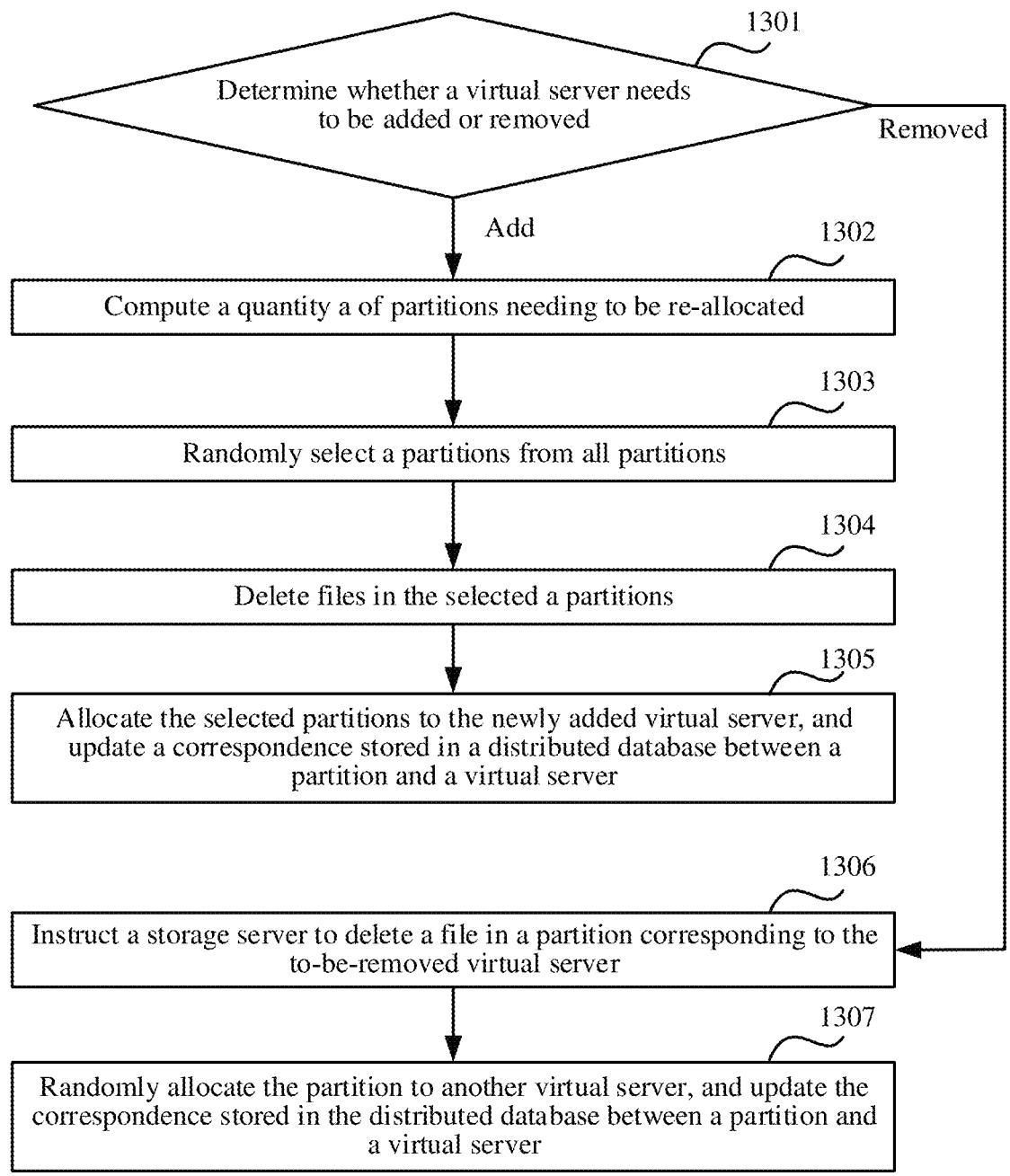
FIG. 13 is a flowchart of another content delivery method according to an embodiment of the present disclosure.

FIG. 13 is a flowchart of a content delivery method according to an embodiment of the present disclosure. This embodiment describes how to maintain a correspondence between storage of a storage server and a virtual server during virtual server addition and removal when a storage space of a storage server in a server cluster of an edge node is partitioned and each partition is managed by one virtual server. The method includes the following steps.

Step 1301: A cloud platform determines, according to a load status, whether a virtual server needs to be added or removed.

When a virtual server needs to be added, step 1302 is performed. When a virtual server needs to be removed, step 1306 is performed.

Step 1302: When a virtual server needs to be added, the cloud platform computes a quantity a of partitions needing to be re-allocated to the newly added virtual server.

For example, an average value of quantities of partitions managed by virtual servers may be used as a.

Step 1303: The cloud platform randomly selects a partition from all partitions.

For example, a sampling method of uniform sampling may be used.

Step 1304: The cloud platform deletes files in the selected a partitions.

Step 1305: The cloud platform creates a virtual server, allocates the selected partitions to the newly added virtual server, and updates a correspondence stored in a distributed database between a partition and a virtual server.

Updating a correspondence stored in a distributed database between a partition and a virtual server includes deleting an original correspondence between the selected partitions and a virtual server in the distributed database, and adding a correspondence between the selected partitions and the newly added virtual server.

Step 1306: When a virtual server needs to be removed, the cloud platform instructs a storage server to delete a file in a partition corresponding to the to-be-removed virtual server.

Step 1307: The cloud platform deletes the to-be-removed virtual server, randomly allocates the partition corresponding to the virtual server to another virtual server, and updates the correspondence stored in the distributed database between a partition and a virtual server.

Updating the correspondence stored in the distributed database between a partition and a virtual server includes deleting a correspondence between the partition and the removed virtual server in the distributed database, and establishing a correspondence between the partition and the other virtual server.

In this embodiment of the present disclosure, alternatively, one storage server may be divided into one or more partitions, and each storage partition may be accessed and managed by multiple virtual servers. A corresponding advantage is that it is easy to maintain a correspondence between storage of a storage server and a virtual server during virtual server addition and removal. A corresponding disadvantage is that a virtual server cannot implement interlinked storage on partitions managed by the virtual server, leading to relatively low disk utilization.

For each storage partition, multiple virtual servers are randomly selected as virtual servers allocated to the storage partition. A correspondence between a storage partition and a virtual server is stored in the distributed database of a CDN. The present disclosure does not limit a quantity of selected virtual servers.

In this embodiment of the present disclosure, each storage server may have one partition, that is, a storage space of the storage server may be not divided, and partitioning is not necessary. The following embodiment is described using an example in which a quantity of partitions is 1.

Figure 14:
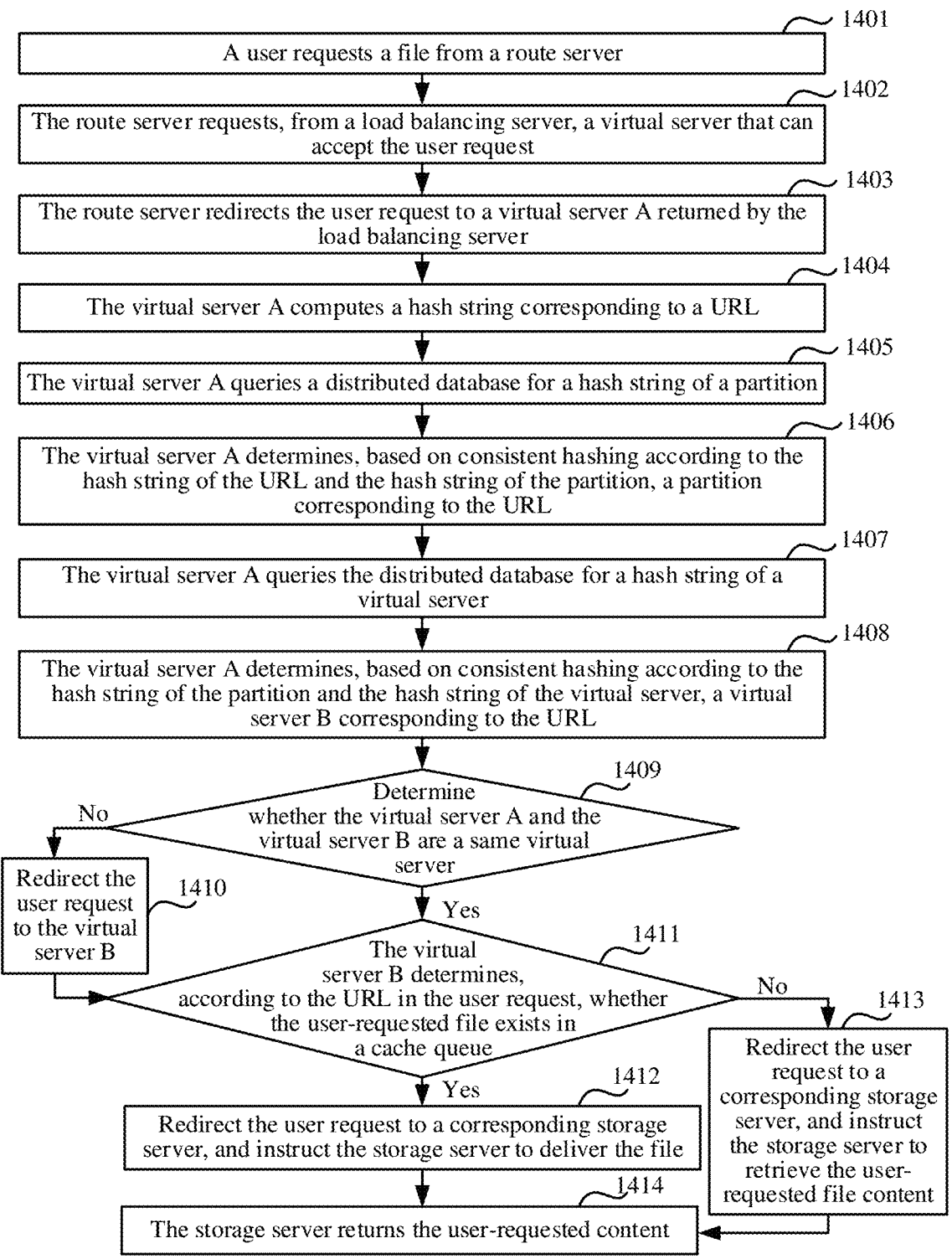
FIG. 14 is a flowchart of another content delivery method according to an embodiment of the present disclosure.

FIG. 14 is a flowchart of a content delivery method according to an embodiment of the present disclosure. This embodiment describes a file delivery procedure performed when a storage space of a storage server in a server cluster of an edge node is partitioned and each partition may be managed by multiple virtual servers. The method includes the following steps.

Step 1401: A user requests a file from a route server.

Step 1402: The route server requests, from a load balancing server, a virtual server that can accept the user request.

Step 1403: The route server redirects the user request to a virtual server A returned by the load balancing server.

Step 1404: The virtual server A computes a hash string corresponding to a URL.

Step 1405: The virtual server A queries a distributed database for a hash string of a partition.

Step 1406: The virtual server A determines, based on consistent hashing according to the hash string of the URL and the hash string of the partition, a partition corresponding to the URL.

A key technical solution corresponding to steps 1401 to 1406 is that a virtual server determines, according to a URL, a partition needing to process the URL such that a storage server processing the URL is determined.

The virtual server first determines, according to the URL, a storage partition needing to process the URL and a corresponding storage server, and then determines a virtual server corresponding to the URL.

A method for determining, according to a URL, a partition needing to process the URL is the consistent hashing method described above.

A specific determining method is to perform a hash on IDs of a URL and a storage partition based on a hash algorithm, for example, a murmur algorithm to obtain a hash string of the URL and a hash string of the server. All possible hash strings form a loop, and each point on the loop corresponds to a hash string. Therefore, the hash string of the URL and the hash string of the storage partition each correspond to a point on the loop. Clockwise starting from the point corresponding to the hash string of the URL, the first point corresponding to a hash string of a storage partition is found, and the storage partition is a storage partition used to store, during caching, content corresponding to the URL. A storage server in which the storage partition is located is a storage server processing the URL.

Usually, a quantity of storage partitions is far less than a quantity of URLs. To implement load balance, multiple hash strings are generated for one storage partition, and one storage partition corresponds to multiple points on the loop. A method for generating multiple hash strings may be to add a sequence number behind an ID of a storage partition.

Step 1407: The virtual server A queries the distributed database for a hash string of a virtual server.

Step 1408: The virtual server A determines, based on consistent hashing according to the hash string of the partition and the hash string of the virtual server, a virtual server B corresponding to the URL.

A precondition for step 1408 includes when establishing the distributed database, a cloud platform determines a correspondence between a hash string of a partition and a hash string of a virtual server according to consistent hashing, and stores the correspondence in the distributed database.

In this embodiment of the present disclosure, for the determining the virtual server corresponding to the URL, step 1408 may be replaced with a manner of querying the distributed database.

A key technical solution corresponding to steps 1407 and 1408 is that a virtual server determines, according to a URL, a virtual server needing to process the URL.

In this embodiment of the present disclosure, after the storage partition and the storage server that correspond to the URL are obtained, a correspondence between a storage partition and a virtual server is obtained by still using a consistent hashing algorithm to obtain the virtual server corresponding to the URL.

Figure 15:
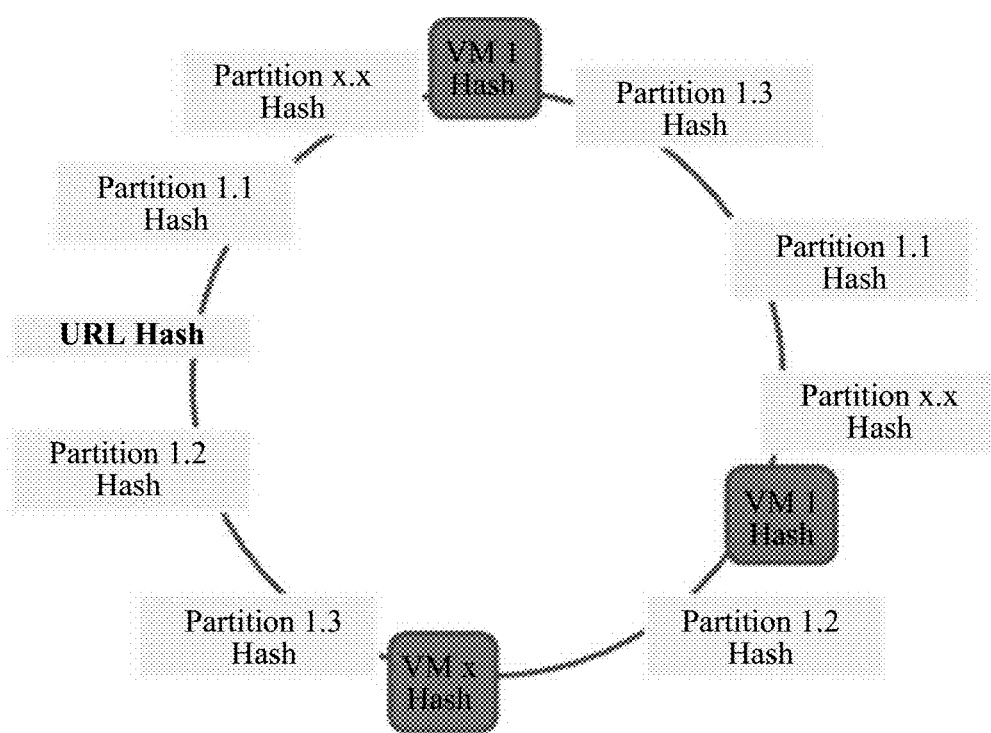
FIG. 15 is a schematic diagram of another correspondence between a storage partition and a virtual server.

FIG. 15 is a schematic diagram of a correspondence between a storage partition and a virtual server. Referring to FIG. 15, each partition as well as each virtual server corresponds to multiple hash strings, and each partition as well as each virtual server corresponds to a plurality of points on a hash loop. The correspondence between a partition and a virtual server means finding a nearest point of a virtual server clockwise starting from a point of a partition. For multiple points corresponding to each partition, different virtual servers corresponding to the points may be found. In this way, a same partition may be managed by multiple virtual servers.

Referring to FIG. 15, a specific determining method is to perform a hash on an ID of a storage partition and an ID of a virtual server based on a hash algorithm, for example, a murmur algorithm, to obtain hash strings of the storage partition and the virtual server. All possible hash strings form a loop, and each point on the loop corresponds to a hash string. Therefore, the hash string of the storage partition and the hash string of the virtual server each correspond to a point on the loop. Clockwise starting from the point corresponding to the hash string of the storage partition, the first point corresponding to a hash string of a virtual server is found, and the virtual server is a virtual server processing a URL corresponding to the storage partition.

Usually, a quantity of storage partitions and a quantity of virtual servers are both small. To implement load balance, multiple hash strings are generated for one storage partition, and one storage partition corresponds to multiple points on the loop. A method for generating multiple hash strings may be to add a sequence number behind an ID of a storage partition. Multiple hash strings are generated for one virtual server, and one virtual server corresponds to multiple points on the loop. A method for generating multiple hash strings may be to add a sequence number behind an ID of a virtual server.

The correspondence between a storage partition and a virtual server is stored in the distributed database of the CDN after being obtained. When one partition is managed by one virtual server, a one-to-one correspondence between the partition and the virtual server is stored in the database. Herein, a correspondence between each hash string of each partition and a virtual server is stored in the database, and each partition actually corresponds to multiple virtual servers.

Step 1409: If the virtual server A and the virtual server B are a same virtual server, go to step 1411, or otherwise, go to step 1410.

Step 1410: Redirect the user request to the virtual server B.

Step 1411: The virtual server B determines, according to the URL in the user request, whether the user-requested file exists in a cache queue.

Step 1412: If the user-requested file is in the cache queue, redirect the user request to a corresponding storage server, and instruct the storage server to deliver the file.

Step 1413 If the user-requested file is not in the cache queue, redirect the user request to a corresponding storage server, and instruct the storage server to retrieve the user-requested file content.

Step 1414: The storage server returns the user-requested content.

Figure 16:
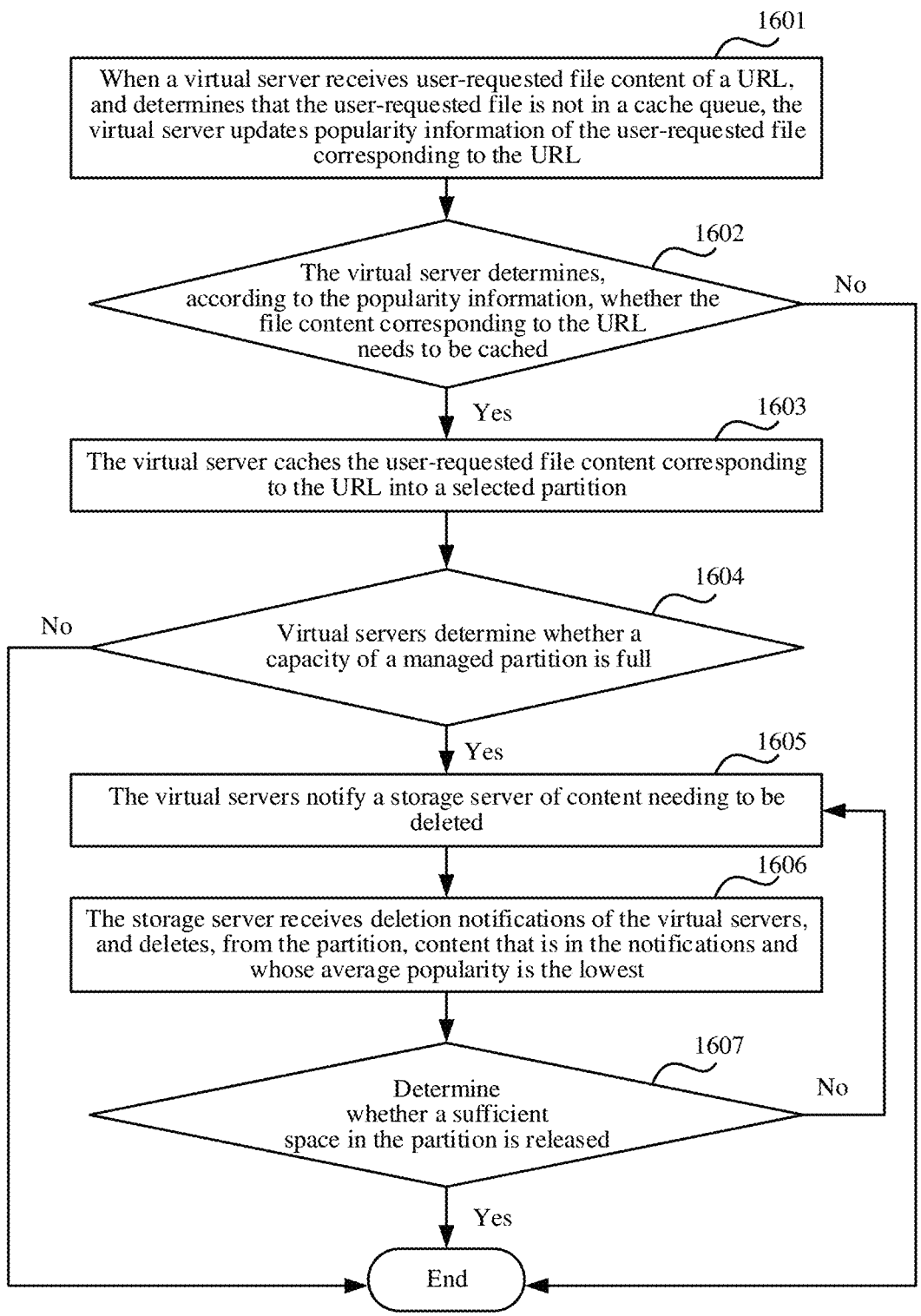
FIG. 16 is a flowchart of another content delivery method according to an embodiment of the present disclosure.

FIG. 16 is a flowchart of a content delivery method according to an embodiment of the present disclosure. This embodiment describes how a virtual server manages file storage and deletion of a storage server when a storage space of a storage server in a server cluster of an edge node is partitioned and each partition may be managed by multiple virtual servers. The method includes the following steps.

Step 1601: When a virtual server receives user-requested file content of a URL, and determines that the user-requested file is not in a cache queue, the virtual server updates popularity information of the user-requested file corresponding to the URL.

Step 1601 may be performed after step 1413.

Step 1602: The virtual server determines, according to the popularity information, whether the file content corresponding to the URL needs to be cached. If yes, go to step 1603. Otherwise, the procedure ends.

A key technical solution corresponding to step 1603 is how to store file content in a cache queue on a storage server.

In this embodiment of the present disclosure, one partition may be managed by multiple virtual servers, and one virtual server may manage multiple partitions. To avoid a decrease in a hit rate caused by uneven popularities, the virtual server creates only one cache queue for managed multiple partitions. A file in the cache queue is stored in a partition corresponding to a URL of the file.

Step 1603: The virtual server caches the user-requested file content corresponding to the URL into a selected partition.

The selected partition is a partition that is determined according to a consistent hashing algorithm and that corresponds to the URL.

A storage server reports, to all virtual servers managing a partition of the storage server, a storage capacity of the partition periodically or in an event-triggered manner.

Step 1604: Virtual servers determine whether a capacity of a managed partition is full.

If a determining result is yes, step 1605 is performed. Otherwise, the procedure ends.

Step 1605: The virtual servers notify a storage server of content needing to be deleted.

The virtual servers mean multiple virtual servers managing the partition.

Step 1606: The storage server receives deletion notifications of the virtual servers, and deletes, from the partition, content that is in the notifications and whose average popularity is the lowest.

According to different preset policies, content that is in the notifications and whose maximum popularity is the lowest may be deleted, or content that is in the notifications and whose minimum popularity is the lowest may be deleted.

Step 1607: If a sufficient space in the partition is released, end the procedure, or otherwise, go to step 1605.

A key technical solution corresponding to steps 1604 to 1607 is how to delete file content when a storage server is fully occupied.

The storage server monitors capacity occupation statuses of all partitions of the storage server, and notifies virtual servers corresponding to the partitions of the capacity occupation statuses periodically or in an event-triggered manner. In this embodiment, because one partition is managed by multiple virtual servers, if a storage capacity of a partition is full, content that corresponds to the partition and whose popularity is the lowest in cache queues of the multiple virtual servers needs to be deleted.

A specific method is as follows. The storage server notifies the virtual servers corresponding to the partition that a % content whose popularity is relatively low, for example, 5% content whose popularity is relatively low, needs to be evicted from the partition. The virtual servers send, to the storage server, b % content that is in the partition and whose popularity is the lowest in cache queues of the virtual servers. A size of b % content needs to be far less than a size of a % content. For example, b % is 1/10 of a %. In addition, the virtual servers send average popularities or maximum or minimum popularities of the virtual servers to the storage server. The storage server receives the content that is sent by the virtual servers and whose popularity is the lowest, deletes, from the content, content that is sent by a virtual server and whose average popularity or maximum or minimum popularity is the lowest, and continues to send a new eviction notification to the virtual server. The storage server receives new content needing to be evicted, compares an average popularity or a maximum or minimum popularity of the content with an average popularity or a maximum or minimum popularity of content that is not evicted in the previous round, and deletes, from the content, content that is sent by a virtual server and whose average popularity or maximum or minimum popularity is the lowest. The previous steps are repeated until eviction is completed, that is, a % content is evicted.

Figure 17:
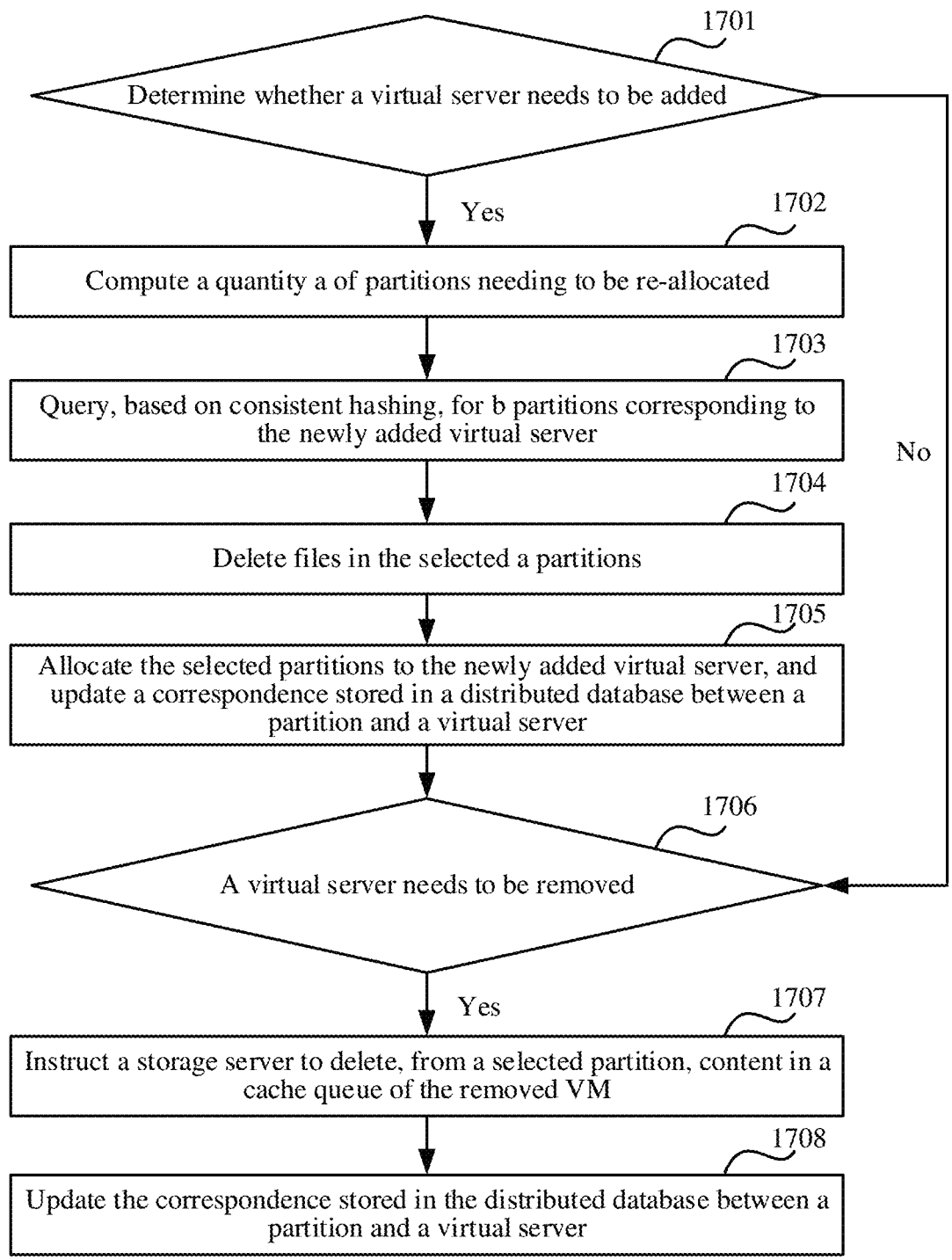
FIG. 17 is a flowchart of a virtual server management method according to an embodiment of the present disclosure.

FIG. 17 is a flowchart of a virtual server management method according to an embodiment of the present disclosure. The embodiment describes how to maintain a correspondence between storage of a storage server and a virtual server during virtual server addition and removal when storage of a storage server in a server cluster of an edge node is partitioned and each partition may be managed by multiple virtual servers. The method includes the following steps.

Step 1701: A cloud platform determines, according to a load status, that a virtual server needs to be added.

An execution device/module in a CDN needs to be capable of monitoring load statuses of all VMs, determines, according to service logic that is set in an actually, whether an expansion threshold is reached. Generally, a VM management module of the cloud platform performs monitoring and expansion.

Step 1702: The cloud platform computes a hash string of the newly added virtual server.

Step 1703: The cloud platform queries a distributed database for hash strings of a partition and a virtual server, and queries, based on consistent hashing, for b partitions corresponding to the newly added virtual server.

Step 1704: The cloud platform deletes, from the b partitions returned after query, a file that is in a cache queue of an existing VM and that does not belong to the existing VM anymore.

When a correspondence between a partition and a VM is re-determined in step 1704, a partition corresponding to the existing VM may be changed. In this case, the correspondence between a partition and a VM needs to be adjusted in the database. In addition, the cache queue of the existing VM needs to be adjusted, and a file that is not managed by each VM anymore is deleted. Then a storage server deletes, from partitions, files that are deleted by existing VMs from cache queues, that is, deletes, from re-allocated partitions, content belonging to cache queues of original corresponding virtual servers.

Step 1705: Allocate the selected partitions to the newly added virtual server, and update a correspondence stored in the distributed database between a partition and a virtual server.

Step 1706: The cloud platform determines, according to a load status, that a virtual server needs to be removed.

Step 1707: The cloud platform instructs a storage server to delete, from a selected partition, content in a cache queue of the removed VM.

Step 1708: Update the correspondence stored in the distributed database between a partition and a virtual server.

This embodiment of the present disclosure provides a virtual server management method. A cloud platform and an independent storage server (for example, a streaming server) are used to implement a CDN, maintaining I/O performance while having advantages of a cloud computing platform of being dynamic, flexible, changing, virtual, shared, and efficient, and satisfying a content delivery requirement of media and other large files.

Figure 18:
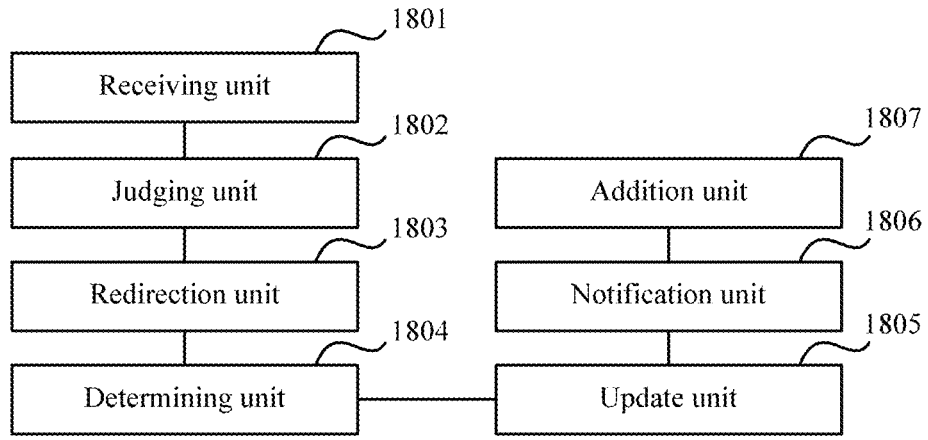
FIG. 18 is a structural diagram of a virtual server according to an embodiment of the present disclosure.

FIG. 18 is a structural diagram of a virtual server according to an embodiment of the present disclosure. The virtual server is configured to execute the content delivery method provided in the foregoing embodiment of the present disclosure, applied to a content delivery system. The content delivery system includes at least two virtual servers and at least two storage servers, any one of the at least two virtual servers manages one or more of the at least two storage servers, and the any virtual server is used as a first virtual server and includes a receiving unit 1801 configured to receive a first request message sent by a content requester, where the first request message carries a first URL of user-requested content, a judging unit 1802 configured to determine, according to a cache list maintained by the first virtual server, that one of the storage servers managed by the first virtual server has cached the content corresponding to the first URL received by the receiving unit 1801, and a redirection unit 1803 configured to redirect the first request message received by the receiving unit 1801 to a first storage server that is recorded in the cache list and that has cached the content corresponding to the first URL, where the first request message redirected to the first storage server is used to instruct the first storage server to send the cached content corresponding to the first URL to the content requester.

In a possible design, the receiving unit 1801 is further configured to receive a second request message sent by the content requester, where the second request message carries a second URL of user-requested content, the judging unit 1802 is further configured to determine, according to the cache list maintained by the first virtual server, that none of the storage servers managed by the first virtual server caches the content corresponding to the second URL carried in the second request message, the virtual server further includes a determining unit 1804 configured to determine, according to a consistent hashing algorithm, a second storage server configured to cache the content corresponding to the second URL carried in the second request message received by the receiving unit 1801, and the redirection unit 1803 is further configured to redirect the second request message received by the receiving unit 1801 to the second storage server, where the second request message redirected to the second storage server is used to instruct the second storage server to retrieve the user-requested content and send the retrieved user-requested content to the content requester.

In a possible design, the virtual server further includes a determining unit 1804 configured to, before the judging unit 1802 determines, according to the cache list maintained by the first virtual server, that one of the storage servers managed by the first virtual server has cached the content corresponding to the first URL, determine, according to the first URL, carried in the first request message received by the receiving unit 1801, of the user-requested content, that the first virtual server processes the first URL.

In a possible design, the determining unit 1804 is further configured to, before the judging unit 1802 determines, according to the cache list maintained by the first virtual server, that none of the storage servers managed by the first virtual server caches the content corresponding to the second URL carried in the second request message, determine, according to the second URL, carried in the second request message received by the receiving unit 1801, of the user-requested content, that the first virtual server processes the second URL.

In a possible design, the receiving unit 1801 is further configured to receive a third request message sent by the content requester, where the third request message carries a third URL of user-requested content, the determining unit 1804 is further configured to determine, according to the third URL, carried in the third request message received by the receiving unit 1801, of the user-requested content, that a second virtual server processes the third URL, and the redirection unit 1803 is further configured to redirect the third request message received by the receiving unit 1801 to the second virtual server.

In a possible design, the determining unit 1804 includes a hash value computation subunit (not shown) configured to compute, according to a URL, carried in a request message received by the receiving unit 1801, of user-requested content, a hash value of the URL, a partition determining subunit configured to obtain hash values of all partitions in a distributed database, and query, based on the consistent hashing algorithm according to the hash value of the URL that is computed by the hash value computation subunit, for a partition corresponding to the URL, where each of the storage servers included in the content delivery system is divided into at least one partition, and a virtual server determining subunit configured to determine, according to a hash value of the partition determined by the partition determining subunit and corresponding to the URL and a correspondence stored in the distributed database between a hash value of a partition and a hash value of a virtual server, the virtual server processing the URL.

In a possible design, each of the storage servers included in the content delivery system is divided into at least one partition, and the virtual server further includes an update unit 1805 configured to, after the redirection unit 1803 redirects the second request message received by the receiving unit 1801 to the second storage server, update popularity information corresponding to the second URL, the determining unit 1804 is further configured to determine, according to the popularity information updated by the update unit 1805, that the content corresponding to the second URL needs to be cached, and determine that a storage capacity of a partition corresponding to the second URL is not full, and the virtual server further includes a notification unit 1806 configured to instruct the second storage server to cache the content corresponding to the second URL into the partition corresponding to the second URL.

In a possible design, each partition corresponds to one virtual server, the determining unit 1804 is further configured to determine that the storage capacity of the partition corresponding to the second URL is full, determine that a storage capacity of at least one of multiple partitions managed by the first virtual server is not full, and select a partition whose storage capacity is not full, the notification unit 1806 is further configured to instruct the second storage server to cache the content corresponding to the second URL into the selected partition, the virtual server further includes an addition unit 1807 configured to add a hash value of the second URL, a hash value of the partition caching the content corresponding to the second URL, and the popularity information corresponding to the second URL to a record of a cache queue, the determining unit 1804 is further configured to determine that the storage capacity of the partition corresponding to the second URL is full, determine that storage capacities of the multiple partitions managed by the first virtual server are all full, and query the cache queue for a record whose popularity is lower than a first threshold, and the notification unit 1806 is further configured to instruct, according to the record found by the determining unit 1804, a storage server corresponding to a partition in the record to delete content corresponding to a URL in the record.

In a possible design, each partition has multiple hash values, and one hash value of each partition corresponds to one virtual server, the receiving unit 1801 is further configured to, after the redirection unit 1803 redirects the second request message to the second storage server, receive notification information that is reported when the storage capacity of the partition corresponding to the second URL is full and that indicates that the partition is full, where the notification information is reported by the second storage server to which the partition belongs to multiple virtual servers managing the partition, and the notification unit 1806 is further configured to send a deletion notification to the second storage server, where the deletion notification carries a URL of content that is in the partition managed by the first virtual server and whose popularity lower than a second threshold, and the deletion notification is used to instruct the second storage server to determine, according to popularity information of the content corresponding to the URL carried in the deletion notification, whether to delete the content corresponding to the URL carried in the deletion notification.

Figure 19:
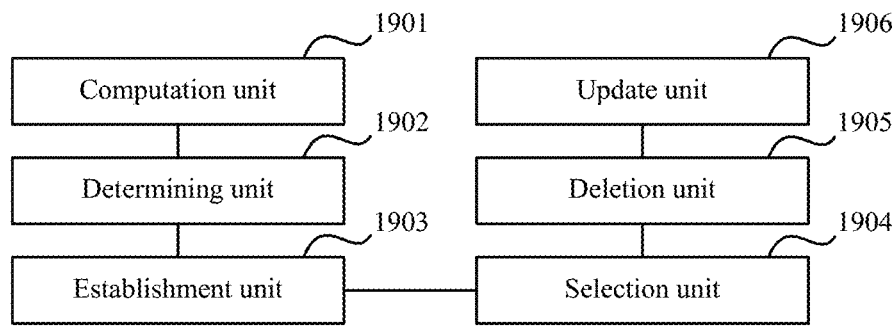
FIG. 19 is a structural diagram of a virtual server management apparatus according to an embodiment of the present disclosure.

FIG. 19 is a structural diagram of a virtual server management apparatus according to an embodiment of the present disclosure. The apparatus is configured to execute the virtual server management method provided in the foregoing embodiment of the present disclosure, applied to a content delivery system. The content delivery system includes at least two virtual servers and at least two storage servers, any one of the at least two virtual servers manages one or more of the at least two storage servers, each of the one or more storage servers is divided into at least one partition, each of the at least one partition is managed by one virtual server, and the apparatus includes a computation unit 1901 configured to compute a hash value of each partition of the content delivery system and a hash value of each virtual server of the content delivery system, a determining unit 1902 configured to determine, according to a consistent hashing algorithm or a random selection manner, a virtual server corresponding to each partition, and an establishment unit 1903 configured to establish a distributed database, and store a correspondence between a hash value of a partition and a hash value of a virtual server in the distributed database.

In a possible design, the determining unit 1902 is further configured to determine, according to load of the content delivery system, that a virtual server needs to be newly added, and determine a quantity of partitions needing to be allocated to the newly added virtual server, the apparatus further includes a selection unit 1904 configured to select a partition whose quantity is the quantity determined by the determining unit 1902 from all partitions, a deletion unit 1905 configured to instruct a storage server to delete content in the partition selected by the selection unit 1904, and an update unit 1906 configured to allocate the partition selected by the selection unit 1904 to the newly added virtual server, and update a correspondence between a partition and a virtual server in the distributed database, the determining unit 1902 is further configured to determine, according to load of the content delivery system, that a virtual server needs to be removed, the deletion unit 1905 is further configured to instruct a storage server to delete content in a partition corresponding to the to-be-removed virtual server, the update unit 1906 is further configured to allocate the partition corresponding to the to-be-removed virtual server to another virtual server, and update the correspondence between a partition and a virtual server, and the deletion unit 1905 is further configured to delete the to-be-removed virtual server.

Figure 20:
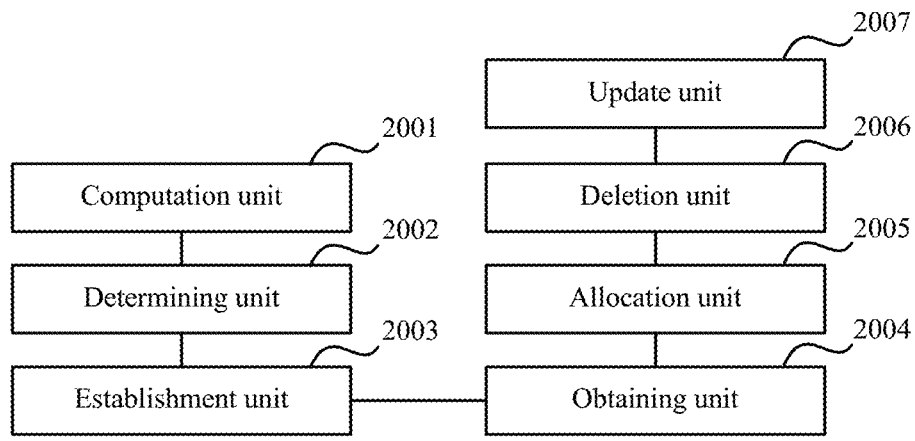
FIG. 20 is a structural diagram of another virtual server management apparatus according to an embodiment of the present disclosure.

FIG. 20 is a structural diagram of a virtual server management apparatus according to an embodiment of the present disclosure. The apparatus is configured to execute the virtual server management method provided in the foregoing embodiment of the present disclosure, applied to a content delivery system. The content delivery system includes at least two virtual servers and at least two storage servers, any one of the at least two virtual servers manages one or more of the at least two storage servers, each of the one or more storage servers is divided into at least one partition, each of the at least one partition is managed by multiple virtual servers, each partition has multiple hash values, one hash value of each partition corresponds to one virtual server, and the apparatus includes a computation unit 2001 configured to compute a hash value of each partition of the content delivery system and a hash value of each virtual server of the content delivery system, a determining unit 2002 configured to determine, according to a consistent hashing algorithm or a random selection manner, multiple virtual servers corresponding to each partition, and an establishment unit 2003 configured to establish a distributed database, and store a correspondence between a hash value of a partition and a hash value of a virtual server in the distributed database.

In a possible design, the determining unit 2002 is further configured to determine, according to load of the content delivery system, that a virtual server needs to be newly added, the computation unit 2001 is further configured to compute a hash value of the newly added virtual server, the apparatus further includes an obtaining unit 2004 configured to obtain all hash values of all partitions, an allocation unit 2005 configured to allocate a hash value of a corresponding partition to the newly added virtual server based on the consistent hashing algorithm, a deletion unit 2006 configured to instruct a storage server to delete content in a cache queue of a virtual server originally corresponding to the allocated hash value of the partition, and an update unit 2007 configured to allocate the selected hash value of the partition to the newly added virtual server, and update a correspondence between a hash value of a partition and a virtual server in the distributed database, the determining unit 2002 is further configured to determine, according to load of the content delivery system, that a virtual server needs to be removed, and determine a hash value, corresponding to the to-be-removed virtual server, of a partition, the deletion unit 2006 is further configured to instruct a storage server to delete content that is in the partition corresponding to the to-be-removed virtual server and that belongs to a cache queue of the virtual server, the update unit 2007 is further configured to allocate the hash value, corresponding to the to-be-removed virtual server, of the partition to another virtual server, and update the correspondence between a hash value of a partition and a virtual server, and the deletion unit 2006 is further configured to delete the to-be-removed virtual server.

Figure 21:
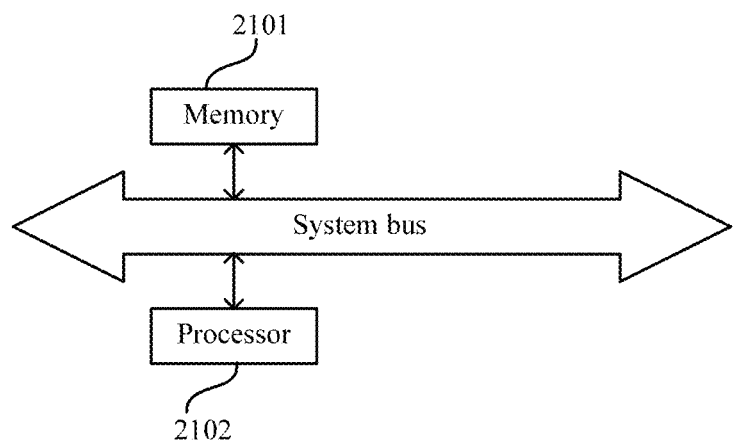
FIG. 21 is a structural diagram of another virtual server according to an embodiment of the present disclosure.

FIG. 21 is a structural diagram of a virtual server according to an embodiment of the present disclosure. The virtual server is configured to execute the content delivery method provided in the foregoing embodiment of the present disclosure, applied to a content delivery system. The content delivery system includes at least two virtual servers and at least two storage servers, any one of the at least two virtual servers manages one or more of the at least two storage servers, and the any virtual server is used as a first virtual server and includes a memory 2101 and a processor 2102.

The memory 2101 is configured to store a program instruction.

The processor 2102 is configured to, according to the program instruction stored in the memory 2101, enable the processor 2102 or the first virtual server to perform the following operations of receiving, by the first virtual server, a first request message sent by a content requester, where the first request message carries a first URL of user-requested content, determining, by the first virtual server according to a cache list maintained by the first virtual server, that one of the storage servers managed by the first virtual server has cached the content corresponding to the first URL, and redirecting the first request message to a first storage server that is recorded in the cache list and that has cached the content corresponding to the first URL, where the first request message redirected to the first storage server is used to instruct the first storage server to send the cached content corresponding to the first URL to the content requester.

In a possible design, the processor 2102 is further configured to, according to the program instruction stored in the memory 2101, enable the processor 2102 or the first virtual server to perform the following operations of receiving, by the first virtual server, a second request message sent by the content requester, where the second request message carries a second URL of user-requested content, determining, by the first virtual server according to the cache list maintained by the first virtual server, that none of the storage servers managed by the first virtual server caches the content corresponding to the second URL carried in the second request message, determining, by the first virtual server according to a consistent hashing algorithm, a second storage server configured to cache the content corresponding to the second URL carried in the second request message, and redirecting the second request message to the second storage server, where the second request message redirected to the second storage server is used to instruct the second storage server to retrieve the user-requested content and send the retrieved user-requested content to the content requester.

In a possible design, the processor 2102 is further configured to, according to the program instruction stored in the memory 2101, enable the processor 2102 or the first virtual server to perform the following operation of determining, by the first virtual server according to the first URL, carried in the first request message, of the user-requested content, that the first virtual server processes the first URL before determining, by the first virtual server according to a cache list maintained by the first virtual server, that one of the storage servers managed by the first virtual server has cached the content corresponding to the first URL.

In a possible design, the processor 2102 is further configured to, according to the program instruction stored in the memory 2101, enable the processor 2102 or the first virtual server to perform the following operation of determining, by the first virtual server according to the second URL, carried in the second request message, of the user-requested content, that the first virtual server processes the second URL before determining, by the first virtual server according to the cache list maintained by the first virtual server, that none of the storage servers managed by the first virtual server caches the content corresponding to the second URL carried in the second request message.

In a possible design, the processor 2102 is further configured to, according to the program instruction stored in the memory 2101, enable the processor 2102 or the first virtual server to perform the following operations of receiving, by the first virtual server, a third request message sent by the content requester, where the third request message carries a third URL of user-requested content, determining, by the first virtual server according to the third URL, carried in the third request message, of the user-requested content, that a second virtual server processes the third URL, and redirecting the third request message to the second virtual server.

In a possible design, an operation, performed by the processor 2102 or the first virtual server, of determining, by the first virtual server according to a URL, carried in a request message, of user-requested content, a virtual server processing the URL includes computing, by the first virtual server according to the URL, carried in the request message, of the user-requested content, a hash value of the URL, obtaining hash values of all partitions in a distributed database, and querying, based on the consistent hashing algorithm according to the hash value of the URL, for a partition corresponding to the URL, where each of the storage servers included in the content delivery system is divided into at least one partition, and determining, according to a hash value of the partition corresponding to the URL and a correspondence stored in the distributed database between a hash value of a partition and a hash value of a virtual server, the virtual server processing the URL.

In a possible design, each of the storage servers included in the content delivery system is divided into at least one partition, and the processor 2102 is further configured to, according to the program instruction stored in the memory 2101, enable the processor 2102 or the first virtual server to perform the following operations of updating, by the first virtual server, popularity information corresponding to the second URL after redirecting the second request message to the second storage server, determining, according to the popularity information, that the content corresponding to the second URL needs to be cached, determining that a storage capacity of a partition corresponding to the second URL is not full, and instructing the second storage server to cache the content corresponding to the second URL into the partition corresponding to the second URL.

In a possible design, each partition corresponds to one virtual server, and the processor 2102 is further configured to, according to the program instruction stored in the memory 2101, enable the processor 2102 or the first virtual server to perform the following operations of determining, by the first virtual server, that the storage capacity of the partition corresponding to the second URL is full, determining that a storage capacity of at least one of multiple partitions managed by the first virtual server is not full, and selecting a partition whose storage capacity is not full, instructing, by the first virtual server, the second storage server to cache the content corresponding to the second URL into the selected partition, and adding a hash value of the second URL, a hash value of the partition caching the content corresponding to the second URL, and the popularity information corresponding to the second URL to a record of a cache queue, or determining, by the first virtual server, that the storage capacity of the partition corresponding to the second URL is full, determining that storage capacities of the multiple partitions managed by the first virtual server are all full, and querying the cache queue for a record whose popularity is lower than a first threshold, and instructing, according to the found record, a storage server corresponding to a partition in the record to delete content corresponding to a URL in the record.

In a possible design, each partition has multiple hash values, one hash value of each partition corresponds to one virtual server, and the processor 2102 is further configured to, according to the program instruction stored in the memory 2101, enable the processor 2102 or the first virtual server to perform the following operations of receiving, by the first virtual server, notification information that is reported when the storage capacity of the partition corresponding to the second URL is full and that indicates that the partition is full after redirecting the second request message to the second storage server, where the notification information is reported by the second storage server to which the partition belongs to multiple virtual servers managing the partition, and sending, by the first virtual server, a deletion notification to the second storage server, where the deletion notification carries a URL of content that is in the partition managed by the first virtual server and whose popularity lower than a second threshold, and the deletion notification is used to instruct the second storage server to determine, according to popularity information of the content corresponding to the URL carried in the deletion notification, whether to delete the content corresponding to the URL carried in the deletion notification.

Figure 22:
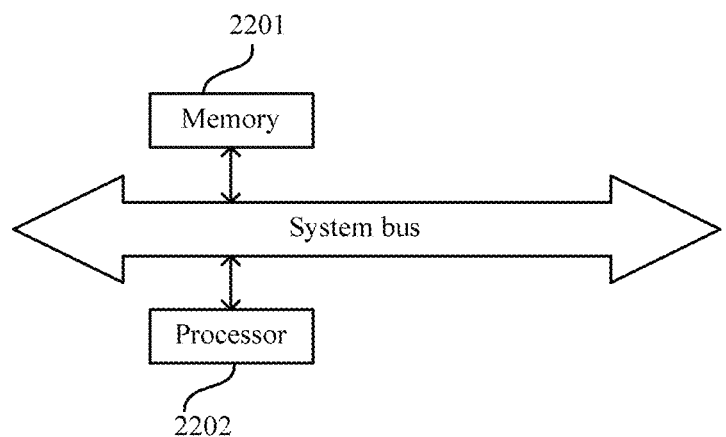
FIG. 22 is a structural diagram of a cloud platform according to an embodiment of the present disclosure.

FIG. 22 is a structural diagram of a cloud platform according to an embodiment of the present disclosure, applied to a content delivery system. The content delivery system includes at least two virtual servers and at least two storage servers, any one of the at least two virtual servers manages one or more of the at least two storage servers, each of the one or more storage servers is divided into at least one partition, each of the at least one partition is managed by one virtual server, and the cloud platform includes a memory 2201 and a processor 2202.

The memory 2201 is configured to store a program instruction.

The processor 2202 is configured to, according to the program instruction stored in the memory 2201, enable the processor 2202 or the cloud platform to perform the following operations of computing, by a cloud platform, a hash value of each partition of the content delivery system and a hash value of each virtual server of the content delivery system, determining, according to a consistent hashing algorithm or a random selection manner, a virtual server corresponding to each partition, and establishing a distributed database, and storing a correspondence between a hash value of a partition and a hash value of a virtual server in the distributed database.

In a possible design, the processor 2202 is further configured to, according to the program instruction stored in the memory 2201, enable the processor 2202 or the cloud platform to perform the following operations of determining, by the cloud platform according to load of the content delivery system, that a virtual server needs to be newly added, determining a quantity of partitions needing to be allocated to the newly added virtual server, selecting a partition whose quantity is the quantity from all partitions, instructing a storage server to delete content in the selected partition, and allocating the selected partition to the newly added virtual server, and updating a correspondence between a partition and a virtual server in the distributed database, or determining, by the cloud platform according to load of the content delivery system, that a virtual server needs to be removed, instructing, by the cloud platform, a storage server to delete content in a partition corresponding to the to-be-removed virtual server, allocating the partition corresponding to the to-be-removed virtual server to another virtual server, and updating the correspondence between a partition and a virtual server, and deleting the to-be-removed virtual server.

Figure 23:
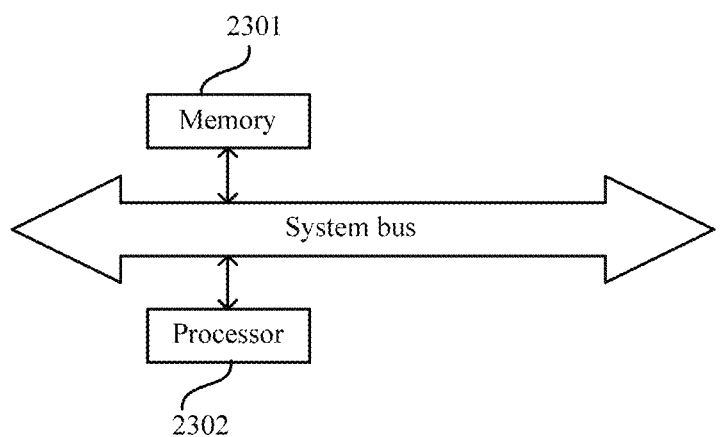
FIG. 23 is a structural diagram of another cloud platform according to an embodiment of the present disclosure.

FIG. 23 is a structural diagram of another cloud platform according to an embodiment of the present disclosure, applied to a content delivery system. The content delivery system includes at least two virtual servers and at least two storage servers, any one of the at least two virtual servers manages one or more of the at least two storage servers, each of the one or more storage servers is divided into at least one partition, each of the at least one partition is managed by multiple virtual servers, each partition has multiple hash values, one hash value of each partition corresponds to one virtual server, and the cloud platform includes a memory 2301 and a processor 2302.

The memory 2301 is configured to store a program instruction.

The processor 2302 is configured to according to the program instruction stored in the memory 2301, enable the processor 2302 or the cloud platform to perform the following operations of computing, by a cloud platform, a hash value of each partition of the content delivery system and a hash value of each virtual server of the content delivery system, determining, according to a consistent hashing algorithm or a random selection manner, multiple virtual servers corresponding to each partition, and establishing a distributed database, and storing a correspondence between a hash value of a partition and a hash value of a virtual server in the distributed database.

In a possible design, the processor 2302 is further configured to, according to the program instruction stored in the memory 2301, enable the processor 2302 or the cloud platform to perform the following operations of determining, by the cloud platform according to load of the content delivery system, that a virtual server needs to be newly added, computing, by the cloud platform, a hash value of the newly added virtual server, obtaining all hash values of all partitions, allocating a hash value of a corresponding partition to the newly added virtual server based on the consistent hashing algorithm, instructing a storage server to delete content in a cache queue of a virtual server originally corresponding to the allocated hash value of the partition, and allocating the selected hash value of the partition to the newly added virtual server, and updating a correspondence between a hash value of a partition and a virtual server in the distributed database, or determining, by the cloud platform according to load of the content delivery system, that a virtual server needs to be removed, determining, by the cloud platform, a hash value, corresponding to the to-be-removed virtual server, of a partition, instructing a storage server to delete content that is in the partition corresponding to the to-be-removed virtual server and that belongs to a cache queue of the virtual server, allocating the hash value, corresponding to the to-be-removed virtual server, of the partition to another virtual server, and updating the correspondence between a hash value of a partition and a virtual server, and deleting the to-be-removed virtual server.

The method in the present disclosure in which a server cluster of an edge node in a CDN is implemented using a cloud computing technology and an independent storage server may also be applied to a server cluster of a central node in the CDN and a server cluster of an intermediate node between the central node and the edge node.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Persons of ordinary skill in the art may understand that all or a part of the steps in each of the foregoing method of the embodiments may be implemented by a program instructing a processor. The foregoing program may be stored in a computer readable storage medium. The storage medium may be a non-transitory medium, such as a random-access memory, a read-only memory, a flash memory, a hard disk, a solid state drive, a magnetic tape, a floppy disk, an optical disc, or any combination thereof.

The foregoing descriptions are merely example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A content delivery method, applied to a content delivery system comprising a first virtual server and a second virtual server, and a first storage server and a second storage server, wherein the first virtual server manages the first storage server and the second storage server, and wherein the first virtual server is configured to execute the method, which comprises:
receiving, by the first virtual server, a first request message comprising a first uniform resource locator (URL) of user-requested content from a content requester;
determining, by the first virtual server according to a cache list maintained by the first virtual server, that one of the first storage server or the second storage server has cached the content corresponding to the first URL;
in response to determining that the first storage server has cached the content corresponding to the first URL, redirecting, by the first virtual server, the first request message to the first storage server recorded in the cache list having cached the content corresponding to the first URL, wherein the first request message instructs the first storage server to send the cached content corresponding to the first URL to the content requester;
receiving, by the first virtual server, a second request message comprising a second URL of user-requested content from the content requester;
determining, by the first virtual server according to the cache list, that neither the first storage server nor the second storage server caches the content corresponding to the second URL;
determining, by the first virtual server according to a consistent hashing algorithm, a second storage server configured to cache the content corresponding to the second URL; and
redirecting, by the first virtual server, the second request message to the second storage server, wherein the second request message instructs the second storage server to retrieve the user-requested content corresponding to the second URL and to send the retrieved user-requested content to the content requester.

2. The method of claim 1, wherein before determining that one of the first storage server or the second storage server has cached the content corresponding to the first URL, the method further comprises determining, by the first virtual server according to the first URL carried in the first request message of the user-requested content, that the first virtual server processes the first URL.

3. The method of claim 1, wherein before determining that neither the first storage server nor the second storage server caches the content corresponding to the second URL carried in the second request message, the method further comprises determining, by the first virtual server according to the second URL carried in the second request message of the user-requested content, that the first virtual server processes the second URL.

4. The method of claim 2, further comprising:
receiving, by the first virtual server, a third request message carrying a third URL of user-requested content from the content requester;
determining, by the first virtual server according to the third URL carried in the third request message of the user-requested content, that the second virtual server processes the third URL; and
redirecting, by the first virtual server, the third request message to the second virtual server.

5. The method of claim 2, wherein determining that the first virtual server processes the URL comprises:
computing, by the first virtual server according to the first URL carried in the first request message of the user-requested content, a hash value of the first URL;
obtaining, by the first virtual server, hash values of all partitions in a distributed database;
querying, by the first virtual server based on a consistent hashing algorithm according to the hash value of the first URL, for a partition corresponding to the first URL, wherein each of the storage servers in the content delivery system is divided into at least one partition; and
determining, according to a hash value of the partition corresponding to the first URL and a correspondence stored in the distributed database between a hash value of a partition and a hash value of a virtual server, that the first virtual server processes the first URL.

6. The method of claim 1, wherein each of the storage servers in the content delivery system comprises at least one partition, and wherein after redirecting the second request message to the second storage server, the method further comprises:
updating, by the first virtual server, popularity information corresponding to the second URL;
determining, by the first virtual server according to the popularity information, that the content corresponding to the second URL needs to be cached;
determining, by the first virtual server, that a storage capacity of a partition corresponding to the second URL is not full; and
instructing, by the first virtual server, the second storage server to cache the content corresponding to the second URL into the partition corresponding to the second URL.

7. The method of claim 6, wherein each partition corresponds to one virtual server, and wherein the method further comprises:
determining, by the first virtual server, that the storage capacity of the partition corresponding to the second URL is full;
determining, by the first virtual server, that a storage capacity of at least one of a plurality of partitions managed by the first virtual server is not full;
selecting, by the first virtual server, a partition whose storage capacity is not full;
instructing, by the first virtual server, the second storage server to cache the content corresponding to the second URL into the selected partition; and
adding, by the first virtual server, to a record of a cache queue, a hash value of the second URL, a hash value of the partition caching the content corresponding to the second URL, and the popularity information corresponding to the second URL.

8. The method of claim 6, wherein each partition corresponds to one virtual server, and wherein the method further comprises:

determining, by the first virtual server, that the storage capacity of the partition corresponding to the second URL is full;

determining, by the first virtual server, that storage capacities of a plurality of partitions managed by the first virtual server are all full;

querying, by the first virtual server, a cache queue for a record whose popularity is lower than a first threshold; and instructing, according to the cache queue, a storage server corresponding to a partition in the record to delete content corresponding to a URL in the record.

9. The method of claim 6, wherein each partition has a plurality of hash values, wherein one hash value of each partition corresponds to one virtual server, and wherein after redirecting the second request message to the second storage server, the method further comprises:

receiving, by the first virtual server, notification information indicating that the partition is full when the storage capacity of the partition corresponding to the second URL is full, wherein the notification information is reported by the second storage server to which the partition belongs to a plurality of virtual servers managing the partition; and sending, by the first virtual server, a deletion notification carrying a URL of content in a partition managed by the first virtual server and whose popularity is lower than a second threshold to the second storage server, wherein the deletion notification instructs the second storage server to determine, according to popularity information of the content corresponding to the URL carried in the deletion notification, whether to delete the content corresponding to the URL carried in the deletion notification.

10. A content delivery system, comprising a first virtual server, a second virtual server, and a first storage server, and a second storage server, wherein the first virtual server manages the first storage server and the second storage server, and wherein the first virtual server is configured to execute a content delivery method, which comprises:

receiving, by the first virtual server, a first request message carrying a first uniform resource locator (URL) of user-requested content from a content requester;

determining, by the first virtual server according to a cache list maintained by the first virtual server, that one of the first storage server or the second storage server has cached the content corresponding to the first URL;

in response to determining that the first storage server has cached the content corresponding to the first URL, redirecting, by the first virtual server, the first request message to the first storage server recorded in the cache list having cached the content corresponding to the first URL, wherein the first request message instructs the first storage server to send the cached content corresponding to the first URL to the content requester;

receiving, by the first virtual server, a second request message comprising a second URL of user-requested content from the content requester;

determining, by the first virtual server according to the cache list, that neither the first storage server nor the second storage server caches the content corresponding to the second URL;

determining, by the first virtual server according to the cache list, that neither the first storage server nor the second storage server caches the content corresponding to the second URL;

determining, by the first virtual server according to a consistent hashing algorithm, a second storage server configured to cache the content corresponding to the second URL; and redirecting, by the first virtual server, the second request message to the second storage server, wherein the second request message instructs the second storage server to retrieve the user-requested content corresponding to the second URL and to send the retrieved user-requested content to the content requester.

11. The content delivery system of claim 1, wherein before determining that one of the first storage server or the second storage server has cached the content corresponding to the first URL, the content delivery method further comprises determining, by the first virtual server according to the first URL carried in the first request message of the user-requested content, that the first virtual server processes the first URL.

12. The content delivery system of claim 11, further comprising:

receiving, by the first virtual server, a third request message carrying a third URL of user-requested content from the content requester;

determining, by the first virtual server according to the third URL carried in the third request message of the user-requested content, that the second virtual server processes the third URL; and redirecting, by the first virtual server, the third request message to the second virtual server.

13. The content delivery system of claim 11, wherein determining that the first virtual server processes the URL comprises:

computing, by the first virtual server according to the first URL carried in the first request message of the user-requested content, a hash value of the first URL;

obtaining, by the first virtual server, hash values of all partitions in a distributed database;

querying, by the first virtual server based on a consistent hashing algorithm according to the hash value of the first URL, for a partition corresponding to the first URL, wherein each of the storage servers in the content delivery system is divided into at least one partition; and determining, according to a hash value of the partition corresponding to the first URL and a correspondence stored in the distributed database between a hash value of a partition and a hash value of a virtual server, that the first virtual server processes the first URL.

14. The content delivery system of claim 10, wherein each of the at least two storage servers in the content delivery system comprises at least one partition, and wherein after redirecting the second request message to the second storage server, further comprises:

determining, by the first virtual server, that a storage capacity of a partition corresponding to the second URL is not full; and instructing, by the first virtual server, the second storage server to cache the content corresponding to the second URL into the partition corresponding to the second URL.

15. The content delivery system of claim 14, wherein each partition corresponds to one virtual server, and further comprising:

determining, by the first virtual server, that the storage capacity of the partition corresponding to the second URL is full;

determining, by the first virtual server, that a storage capacity of at least one of a plurality of partitions managed by the first virtual server is not full;
selecting, by the first virtual server, a partition whose storage capacity is not full;
instructing, by the first virtual server, the second storage server to cache the content corresponding to the second URL into the selected partition; and
adding, by the first virtual server, to a record of a cache queue, a hash value of the second URL, a hash value of the partition caching the content corresponding to the second URL, and the popularity information corresponding to the second URL.

16. The content delivery system of claim 14, wherein each partition corresponds to one virtual server, and further comprising:
determining, by the first virtual server, that the storage capacity of the partition corresponding to the second URL is full;
determining, by the first virtual server, that storage capacities of a plurality of partitions managed by the first virtual server are all full;
querying, by the first virtual server, a cache queue for a record whose popularity is lower than a first threshold; and
instructing, according to the cache queue, a storage server corresponding to a partition in the record to delete content corresponding to a URL in the record.

17. The content delivery system of claim 14, wherein each partition has a plurality of hash values, wherein one hash value of each partition corresponds to one virtual server, and wherein after redirecting the second request message to the second storage server, further comprises:
receiving, by the first virtual server, notification information indicating that the partition is full when the storage capacity of the partition corresponding to the second URL is full, wherein the notification information is reported by the second storage server to which the partition belongs to a plurality of virtual servers managing the partition; and
sending, by the first virtual server, a deletion notification carrying a URL of content in a partition managed by the first virtual server and whose popularity is lower than a second threshold to the second storage server, wherein the deletion notification instructs the second storage server to determine, according to popularity information of the content corresponding to the URL carried in the deletion notification, whether to delete the content corresponding to the URL carried in the deletion notification.

18. The content delivery system of claim 13, wherein determining that the first virtual server processes the URL further comprises:
computing, by a cloud platform, a hash value of each partition and a hash value of each virtual server;
determining, by the cloud platform, a virtual server corresponding to each partition; and
storing, by the cloud platform, a correspondence between a hash value of a partition and a hash value of a virtual server.

* * * * *

UNITED STATES PATENT AND TRADEMARK OFFICE
CERTIFICATE OF CORRECTION

PATENT NO. : 10,911,530 B2
APPLICATION NO. : 15/985071
DATED : February 2, 2021
INVENTOR(S) : Zheng Liu It is certified that error appears in the above-identified patent and that said Letters Patent is hereby corrected as shown below:

In the Claims

Claim 11, Column 48, Line 11: "system of claim 1" should read "system of claim 10"

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*